United States Patent
Wei et al.

(10) Patent No.: US 12,483,031 B2
(45) Date of Patent: Nov. 25, 2025

(54) METHODS AND SYSTEMS FOR CONTROLLING A POWER PLANT DURING NETWORK FREQUENCY FLUCTUATIONS

(71) Applicant: VESTAS WIND SYSTEMS A/S, Aarhus (DK)

(72) Inventors: Mu Wei, Solbjerg (DK); Brian W. Andersen, Ringkøbing (DK); Kouroush Nayebi, Ikast (DK); Kennet Kirk Jensen, Holstebro (DK); Lennart Beland, Silkeborg (DK); Leif Svinth Christensen, Thorsø (DK); Mads Rajczyk Skjelmose, Risskov (DK); Andreas Svendstrup-Bjerre, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/858,503

(22) PCT Filed: Apr. 3, 2023

(86) PCT No.: PCT/DK2023/050091
§ 371 (c)(1),
(2) Date: Oct. 21, 2024

(87) PCT Pub. No.: WO2023/202753
PCT Pub. Date: Oct. 26, 2023

(65) Prior Publication Data
US 2025/0279650 A1  Sep. 4, 2025

(30) Foreign Application Priority Data
Apr. 20, 2022 (DK) .............................. PA202270204

(51) Int. Cl.
*H02J 3/24* (2006.01)
*H02J 3/38* (2006.01)

(52) U.S. Cl.
CPC .............. *H02J 3/241* (2020.01); *H02J 3/381* (2013.01); *H02J 2300/28* (2020.01)

(58) Field of Classification Search
CPC ...... H02J 3/24; H02J 3/241; H02J 3/38; H02J 3/381; H02J 2300/28
See application file for complete search history.

(56) References Cited

U.S. PATENT DOCUMENTS

2015/0381089 A1  12/2015  Tarnowski et al.
2016/0169199 A1  6/2016  Beekmann et al.
(Continued)

FOREIGN PATENT DOCUMENTS

EP  3007298 A1  4/2016
WO  2022194330 A1  9/2022

OTHER PUBLICATIONS

Danish Patent and Trademark Office, 1st Technical Examination including the Search Report and Search Opinion for Application PA 2022 70204 dated Oct. 26, 2022.
(Continued)

*Primary Examiner* — Robert L Deberadinis
(74) *Attorney, Agent, or Firm* — Patterson + Sheridan, LLP; Gero G. McClellan

(57) ABSTRACT

A method of operating a power plant that includes receiving a measured frequency of a power network to which the power plant is connected, and determining whether the measured frequency falls within a first frequency sub-band that overlaps a network-defined frequency deadband. Based at least in part on the measured frequency, a first control signal is output, indicative of either: a first power offset for application to a baseline frequency curve for the power plant
(Continued)

to generate a set point for controlling a power characteristic of the power plant; or a set point for controlling a power characteristic of the power plant, the set point being based on a first power offset applied to a baseline frequency curve for the power plant.

20 Claims, 12 Drawing Sheets

(56) References Cited

U.S. PATENT DOCUMENTS

| | | |
|---|---|---|
| 2018/0329383 A1 | 11/2018 | Lian et al. |
| 2019/0003456 A1 | 1/2019 | Garcia et al. |
| 2020/0169219 A1 | 5/2020 | Zhang et al. |
| 2020/0409404 A1 | 12/2020 | Knobloch |

OTHER PUBLICATIONS

PCT International Search Report and Written Opinion of The International Searching Authority for Application PCT/DK2023/050091 dated Jun. 22, 2023 (Jun. 22, 2023).

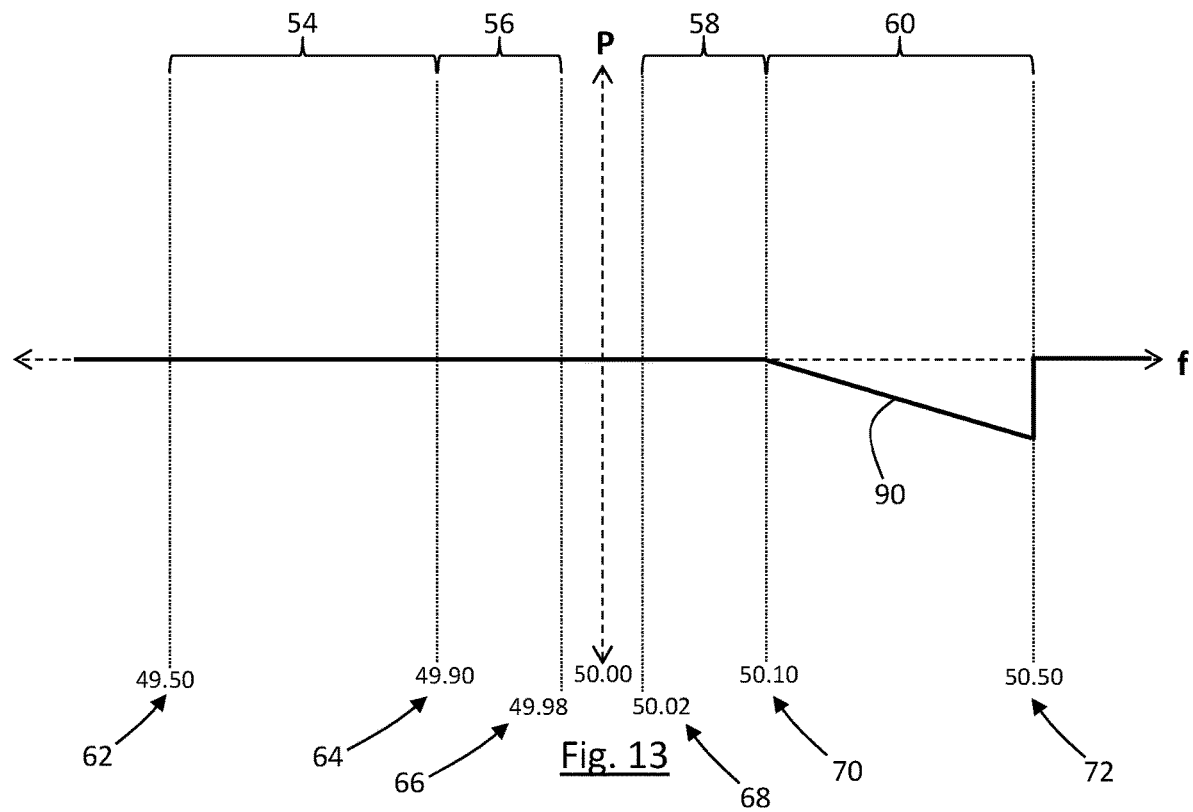
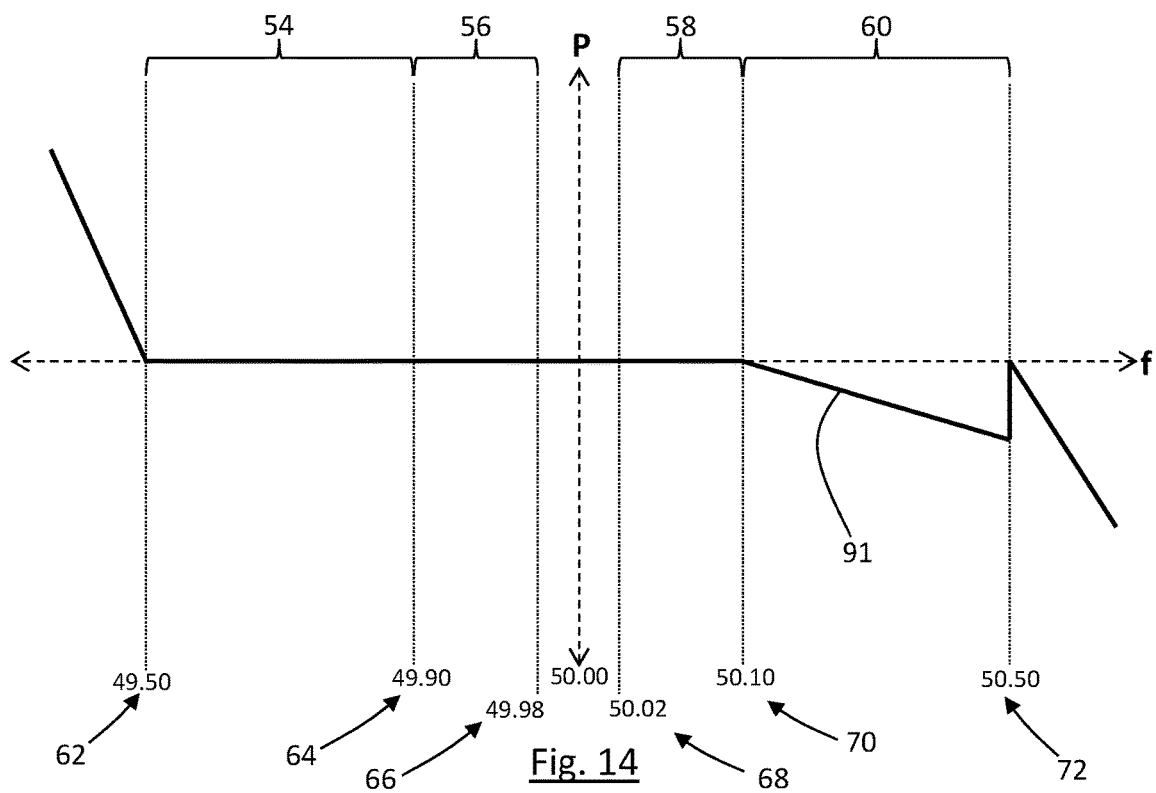

METHODS AND SYSTEMS FOR CONTROLLING A POWER PLANT DURING NETWORK FREQUENCY FLUCTUATIONS

TECHNICAL FIELD

The present disclosure relates to methods and systems for modulating the power output of a power plant.

BACKGROUND

Regulators and operators of power networks expect connected power plants to adhere to a 'grid code' and to provide particular services to the power network.

For example, some operators require power plants to support the power network when the measured frequency of the power network deviates from the normal operational range or a permissible range, also referred to as a frequency contingency deadband.

Power plants employing power generators that rely on variable energy sources, such as wind turbines or solar panels, may face particular challenges in providing such support. For example, the potential power output of such power plants varies in an unpredictable manner.

It is an aim of the present invention to address one or more of the disadvantages associated with the prior art.

SUMMARY OF INVENTION

According to a first aspect, there is provided a method for controlling a power plant that comprises at least one power generator, the power plant having a variable available power output at least partly due to variability of an energy source powering the at least one power generator, the method comprising:
  receiving a measured frequency of a power network to which the power plant is connected;
  determining whether the measured frequency falls within a first frequency sub-band, the first frequency sub-band overlapping a network-defined frequency deadband; and
  responsive to the measured frequency falling within the first frequency sub-band, and based at least in part on the measured frequency, outputting a first control signal indicative of either:
    a first power offset, for application to a baseline frequency curve for the power plant to generate a set point for controlling a power characteristic of the power plant; or
    a set point for controlling a power characteristic of the power plant, the set point being based on a first power offset applied to a baseline frequency curve for the power plant.

Such an approach may assist power plants that are subject to variable power output, due to energy source variability, to better provide frequency support services.

Optionally, a position of the baseline frequency curve on a power axis varies at least partly in dependence upon the available power output of the power plant. For example, the baseline frequency curve may maintain its general shape, but be offset in a positive or negative direction on the power axis, as the available power respectively increases or decreases.

The baseline frequency curve can be, for example, a Power-frequency ("P-f") curve of the type known to the skilled person.

The first frequency sub-band may be bounded by a first frequency and a second frequency, wherein:
  the first frequency is lower than the second frequency;
  the second frequency is lower than or equal to a nominal frequency of the power network; and
  the first power offset is positive.

Optionally, the baseline frequency curve may further be offset from the available power output when the first power offset will be positive. For example, where the first frequency sub-band is below the nominal frequency of the power network, such that the first power offset is intended to provide frequency support in the form of increased power in response to the measured frequency falling within the first frequency sub-band, it may be desirable to initially implement an additional baseline offset in the form of increased spinning reserve, to ensure there is adequate spinning reserve available to provide the first power offset if/when required.

A value of the first power offset at the second frequency may be zero, such that there is a stepless transition in set points as the measured frequency drops below the second frequency.

As the measured network frequency falls from the second frequency towards the first frequency, the first power offset may:
  ramp up in value over a first frequency range; and
  remain constant or ramp up at a lower rate over a second frequency range that is lower than the first frequency range.

The first frequency range may be continuous with the second frequency range, and the first and second frequency ranges may cover the whole of the first frequency sub-band.

The method may comprise:
  determining whether the measured frequency falls within a second frequency sub-band, the second frequency sub-band overlapping the network-defined frequency deadband; and
  responsive to the measured frequency falling within the second sub-band, and based at least in part on the measured frequency, outputting a second control signal indicative of either:
    a second power offset, for application to the baseline frequency curve for the power plant to generate a set point for controlling the power characteristic of the power plant; or
    a set point for controlling the power characteristic of the power plant, the set point being based on the second power offset applied to the baseline frequency curve for the power plant.

The second sub-band may be bounded by a third frequency and a fourth frequency, wherein:
  the third frequency is lower than the fourth frequency;
  the third frequency is higher than or equal to the nominal frequency of the power network; and
  the second power offset is negative.

A value of the second power offset at the third frequency may be zero, such that there is a stepless transition in set points as the measured frequency rises above the third frequency.

As the measured network frequency rises above the third frequency towards the fourth frequency, the first power offset may:
  ramp down in value over a third frequency range; and
  remains constant or ramp down at a lower rate over a fourth frequency range that is higher than the third frequency range.

The third frequency range may be continuous with the fourth frequency range, and the third and fourth frequency ranges may cover the whole of the second sub-band. The method may comprise, responsive to the measured frequency falling within a further sub-band, and based at least in part on the measured frequency, outputting a further control signal indicative of either:
- a further power offset, for application to the baseline frequency curve for the power plant to generate a set point for controlling the power characteristic of the power plant; or
- a set point for controlling the power characteristic of the power plant, the set point being based on a further power offset applied to a baseline frequency curve for the power plant;
- wherein the further frequency sub-band does not overlap the network-defined frequency deadband or any other sub-band.

According to a second aspect, there is provided a method of controlling a power plant, the method comprising:
- implementing the method of the first aspect when, and only when, the measured frequency falls within the sub-band(s) for which a frequency support mode is determined to be in operation.

The method may comprise, at the start of a period for which the frequency support mode is determined to be in operation, curtailing a power output of the power plant to provide sufficient additional spinning reserve to support a maximum value of any power offset to be applied to the baseline curve.

Optionally, an amount by which the power output of the power plant is curtailed is reduced at least partly, based on an amount of power available by way of a short-term overproduction mode of one or more generators of the power plant.

According to a third aspect, there is provided a power plant controller configured to perform the method of the first or second aspects.

According to a fourth aspect, there is provided a computer-readable storage medium comprising instructions that, when executed by a computer, cause the computer to perform the method described above.

Within the scope of this invention it is expressly intended that the various aspects, embodiments, examples and alternatives set out in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 13 shows a further P-f offset curve;

FIG. 14 shows an output P-f curve based on the further P-f offset curve of FIG. 13;

DETAILED DESCRIPTION

Figure 1:
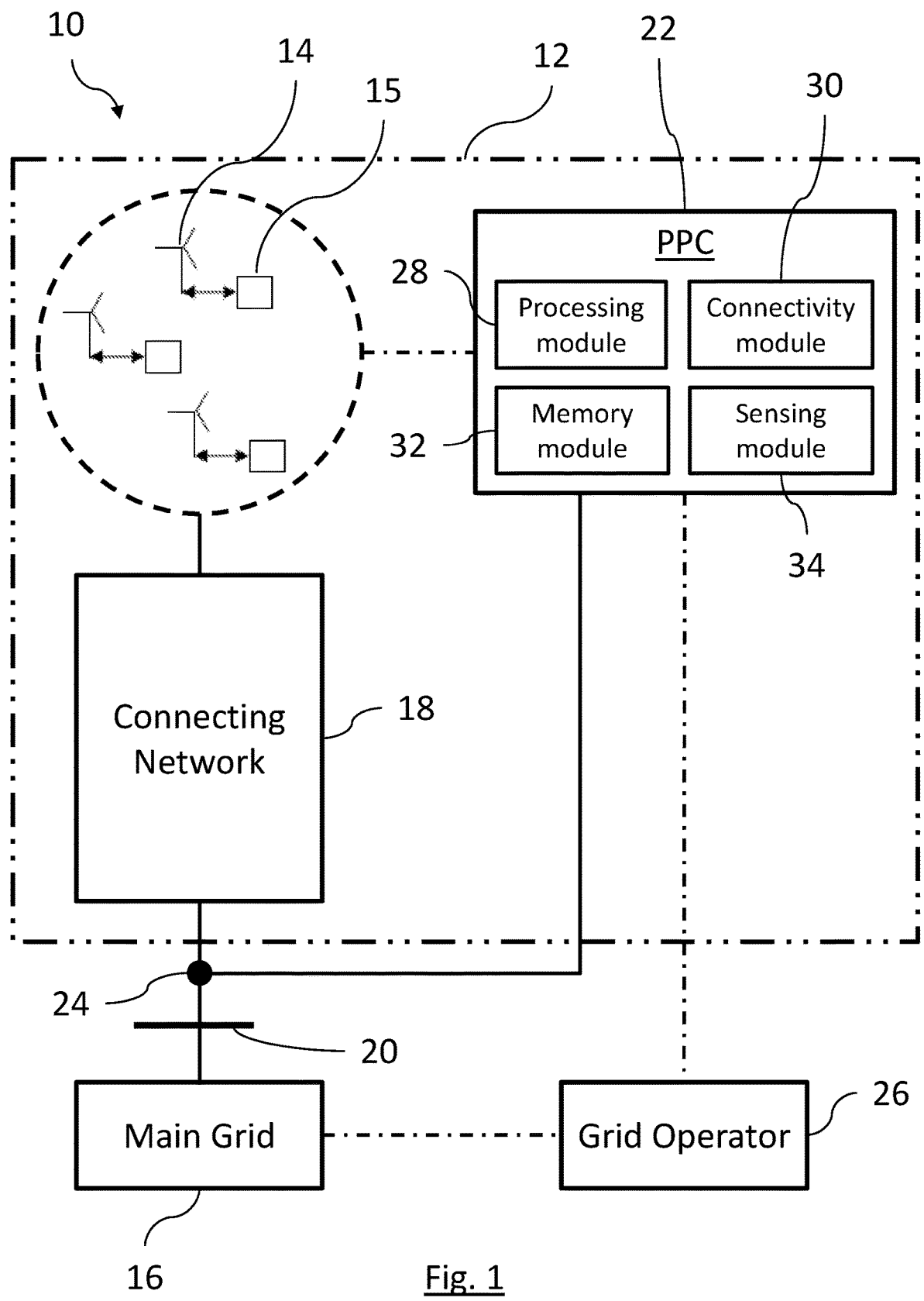
FIG. 1 shows schematically a power network connected to a wind power plant that includes a power plant controller.

Generally, the present invention relates to methods and systems for controlling the power characteristics of a power plant that employs at least one power generator that relies on a variable energy source.

Such power generators can include renewable energy power generators such as wind turbines, photovoltaic panels, concentrated solar thermal plants, ocean wave generators, and the like. The potential power output of such power plants varies in an unpredictable manner, especially over the short term (for example, over periods of the order of seconds or minutes). The term 'power characteristic' encompasses characteristics including an active power output, a reactive power output, and/or a voltage level, for example.

The present disclosure relates to methods and systems for providing such control within one or more frequency sub-bands falling with an acceptable or permissible frequency range known as a frequency contingency deadband. In this context, a frequency contingency deadband is defined as a frequency range defined by the grid operator. The corresponding grid code (i.e., network operation rules set by the grid operator) requires all power plant operators to modify the operation of their power plants in the event the network frequency leaves the contingency deadband.

For example, if the frequency exceeds the contingency deadband, then plant operators need to reduce the output of their power plants, potentially to the point of shutting down one or more plants in extreme over-frequency conditions. Conversely, if the frequency falls beneath the contingency deadband, then plant operators must increase the power output of their plants, dependent upon the ability of individual plants to actually increase their outputs. Deviation of the network frequency outside the frequency contingency deadband signals that the power network is under significant strain due to an imbalance between power load and supply.

The power network operator may require certain actions from power generators in the event of such frequency deviation. For example, if the network frequency falls below the frequency contingency deadband, power generators may be required to provide support to the network, for example by increasing a power output of one or more power plants.

Alternatively, if the network frequency exceeds the frequency contingency deadband, power generators may be required to provide support to the network, for example by reducing a power output of one or more power plants.

Even while the network frequency remains within the frequency contingent deadband, power plant operators may support the network by increasing or decreasing power output of their powerplants, based on a deviation of the current frequency from the network's nominal operating frequency.

Power plants that rely on a controllable source of energy, such as gas- or coal-fired power plants, can provide such support by selectively modulating power output down or up as required. Powerplants that rely on a variable energy source generally offer less controllability. This is particularly true in terms of absolute power output, due to the variable nature of their energy sources.

The present disclosure relates to methods and systems for controlling a power plant that comprises at least one power generator. The power plant has a variable available power output at least partly due to variability of an energy source powering the at least one power generator. It is determined whether a measured frequency of a power network to which the power plant is connected is within a frequency sub-band that overlaps the network-defined frequency deadband. If the frequency falls within the sub-band, and based at least in part on the measured frequency, a first control signal is output.

The first control signal can be indicative of a first power offset, which can be applied to a baseline frequency curve (such as a P-f curve) for the power plant to generate a set point for controlling a power characteristic of the power plant.

Alternatively, the first control signal can be indicative of a set point for controlling a power characteristic of the power plant, the set point being based on a first power offset applied to a baseline frequency curve for the power plant.

In either case, a position of the baseline frequency curve on a power axis may vary at least partly in dependence upon the available power output of the power plant. For example, as the windspeed decreases, the available power output correspondingly decreases. The baseline frequency curve will be offset negatively on the power axis as a result.

A position of the baseline frequency curve on the power axis may also be varied as a result of requests from the grid operator. For example, the grid operator may issue a request for a power plant to curtail its output to 50% of the current possible power (given current windspeed, for example), in which case the power output is reduced accordingly.

Depending upon the implementation, several frequency sub-bands that overlap the frequency contingency deadband can be used, and first control signals output depending upon which sub-band the measured frequency falls within.

FIG. 1 illustrates an example architecture in which a power plant that generates power at least partly based on a variable energy power generator is connected to a main grid or wider power network.

In the example shown in FIG. 1, the power plant is a wind power plant (WPP). As will be understood by the skilled person, a WPP comprises at least one wind turbine generator (WTG), and is also known as a wind park or a wind farm. A WTG is commonly referred to as a 'wind turbine'. The example shown is representative only and the skilled person will appreciate that other specific architectures are possible. In other implementations, the power plant may include one or more different types of power generators, including those that generate power based on variable energy sources, as described above.

In other implementations, the power plant can take the form of a hybrid power plant having a combination of different types of power plants, optionally including one or more power generators and/or power sources having power outputs that are controllable (i.e., not unpredictably variable), such as gas-or coal-fired turbines, battery energy storage, pumped storage, or the like.

Thus, the invention relates to any power plant having at least one power generator that generates power from a variable energy source, rather than being specific to wind power plants and generators as in FIG. 1.

The components of the wind power plant and power network are conventional and as such will be familiar to the skilled person. It is expected that other known components may be incorporated in addition, or as alternatives, to the components shown and described in FIG. 1. Such changes are within the capabilities of the skilled person.

FIG. 1 shows a power system 10 incorporating a WPP 12. In this example, the WPP 12 includes a plurality of WTGs 14 and a power plant controller 22, referred to hereafter as PPC 22. Each of the plurality of WTGs 14 converts wind energy into electrical energy, which is transferred from the WPP 12 to a main power network, or 'main grid' 16, as active power and/or current, for distribution.

Although not illustrated in FIG. 1, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In other implementations, a set of WTGs may share a single, semi-centralised WTG controller, such that there are fewer WTG controllers than WTGs. As will be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current, and/or power, set points received from the PPC 22 to provide frequency and voltage support to the main grid 16. During extraordinary conditions (e.g., where the network frequency deviates from the contingency deadband), the WTG controllers 15 operate to fulfil predetermined network requirements. They also act to protect the WTGs 14 from any potentially harmful conditions, such as overspeed conditions in high winds.

The WPP 12 also includes a connecting network 18 for connecting the WPP 12 to the main grid 16 (also called the main power network). In this example, the WPP 12 and the main grid 16 are connected at a Point of Interconnection (PoI) 20, which is an interface between the WPP 12 and the main grid 16. The PoI 20 may also be referred to as the Point of Common Coupling, which may be abbreviated to 'PCC' or 'PoCC'.

The Power Plant Controller (PPC) 22 is connected to the main grid 16 at a Point of Measurement (PoM) 24 and is connected to the WTG controllers 15. For example, the PPC 22 may be configured to receive one or more measurement signals from the PoM 24 comprising measurements of the power supply from the WPP 12 to the main grid 16 and/or a frequency level of the main grid 16. The role of the PPC 22 is to act as a command and control interface between the WPP 12 and the grid 16, and more specifically, between the WPP 12 and a grid operator 26, such as a transmission system operator (TSO) or a distribution system operator (DSO). The WPP 12 is capable of altering its power or current output in reaction to set points received from the PPC 22.

The PPC 22 is a suitable computer system for carrying out the controls and commands as described herein and so may incorporate a processing module 28, a connectivity module 30, a memory module 32 and a sensing module 34, as shown in FIG. 1.

The connectivity module 30, the memory module 32, and/or the sensing module 34 are configured to provide the processing module 28 with information that is indicative of a frequency level of the main grid 16, as well as power levels, current levels and/or voltage levels of the WTGs 14 and/or the WPP 12.

For example, the sensing module 34 may receive such information directly from one or more connected sensors (e.g. at the PoM 24) and communicate the information to the processing module 28. Alternatively, or additionally, the information may be determined by one or more systems that are connected to the connectivity module 30, such as the WTG controllers 15, and the information may be communicated, in turn, through the connectivity module 30 to the processing module 28. In each case, the determined information may be stored permanently, or temporarily, in the memory module 32, from which it may be recalled, on demand, by the processing module 28. The PPC 22 may also receive information regarding the grid 16 and/or local buses, substations and networks from an energy management system (not shown).

As part of its operation, the PPC 22 generates and sends dispatch signals to the WTG controllers 15. The WTG controllers 15 control the WTGs 14 according to set points contained within the dispatch signals.

In a frequency event, when the frequency level of the main grid 16 deviates from the frequency contingency deadband, the PPC 22 acts to operate the WTGs 14 to provide frequency support to the grid 16. The frequency contingency deadband is generally a small region around the operating frequency of the grid 16, typically 50 Hz, or in some examples 60 Hz, as measured at the PoI 20 or PoM 24. For example, the operating frequency may be 50 Hz and upper and lower frequency limits of the frequency contingency deadband may be +/−0.5 Hz.

In accordance with the control strategies mentioned above, in an example, the PPC 22 may issue dispatch signals configured to control one or more power characteristics of the WTGs 14 in order to provide such frequency support. For example, the dispatch signals may be configured to control the active power output, the reactive power output, and/or the voltage level, of the WTGs 14 so that frequency levels are supported in returning to the frequency contingency deadband.

To give an example, in an underfrequency event when the frequency level of the grid 16 drops below the lower limit of the deadband, the PPC 22 may provide frequency support by dispatching increased active power set points to the WTGs 14, i.e. set points for causing the WTGs 14 to increase the active power supplied to the grid 16. Similarly, in an overfrequency event when the grid frequency rises above the upper limit of the deadband, the PPC 22 may provide frequency support by dispatching decreased active power set points to reduce the active power supply.

Figure 2:
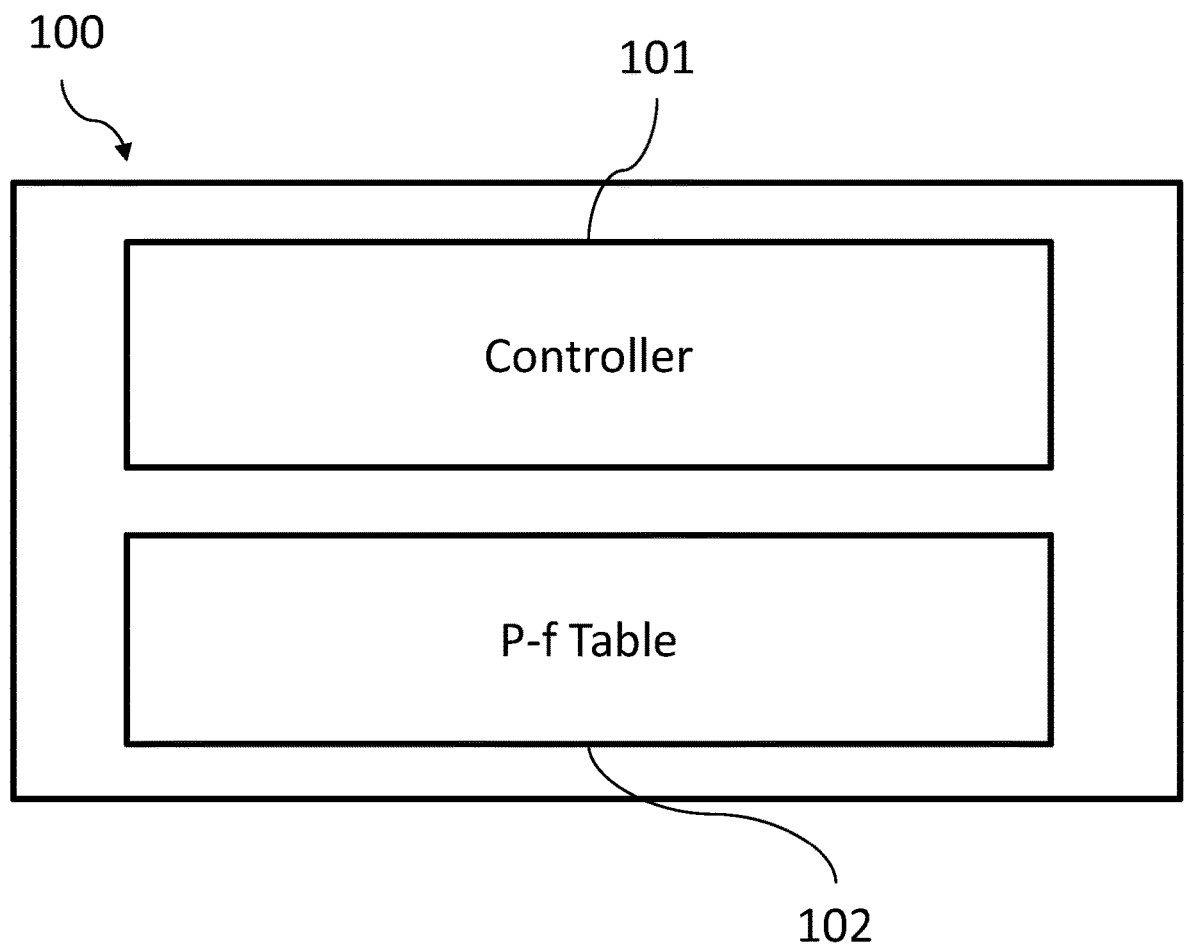
FIG. 2 shows a system diagram of a control module, in accordance with an embodiment of the invention, of the power plant controller of FIG. 1.

FIG. 2 illustrates a program, algorithm, or "control module" 100, in accordance with an embodiment of the invention, which forms part of the processing module 28 of the PPC 22 for determining and dispatching such set points during a frequency event. Control module 100 includes a controller 101 incorporating a program, algorithm, or control scheme for generating the set points for dispatch to the WTG controllers 15 based on the measured frequency of grid 16, as described in more detail below.

In particular, while the frequency level of the connected main grid 16 is outside of the frequency deadband, the control module 100 is configured to receive a measured frequency level of the connected main grid 16, or information that is indicative of that frequency level, and to determine set points for controlling one or more power characteristics of the WTGs 14 based on the frequency level.

Here it shall be appreciated that the measured frequency level provides a precise measurement of the grid frequency, for example having a resolution in the order of mHz or μHz. In an example, the measured frequency level may be filtered to remove noise associated with the measurements. For example, the measured frequency level may be noise-filtered such that negligible changes, i.e. changes between successive measurements that are below respective upper or lower thresholds, are neglected. The control module 100 may receive such a noise-filtered measurement signal or apply suitable noise-filters to determine such a signal itself.

The one or more power characteristics of the WTGs 14 controlled by the control module 100 may, for example, include an active power output, a reactive power output, or a voltage level, of one or more of the WTGs 14. Nonetheless, for the sake of simplicity, in the following description the example control module 100 is configured to control the active power output of the WTGs 14 and the determined set points are active power set points for controlling said active power output. This example is not intended to be limiting on the scope of the invention, however.

Ordinarily, the active power set points may be determined based on the measured frequency level of the connected main grid 16 and vary, in a corresponding manner, with that measured frequency level.

To give an example, the control module 100 may be configured to determine the active power set points, which may start at a baseline value and ramp up (i.e. increase at a constant rate) or ramp down (i.e. decrease at a constant rate) in dependence on the measured frequency level. The active setpoint is normally dependent on an active power command received from an external entity being able to send commands to the power plant e.g., grid operator or owner. Here, the baseline value may correspond to an estimate of the available active power for the WPP 12 to supply to the main grid 16, such as a maximum amount of power output that could be supplied to the main grid 16 for the respective conditions, such as a given wind speed condition.

For this purpose, the control module 100 may include one or more look-up tables 102, as shown in FIG. 2, comprising active power target values for respective frequency level measurements and/or pre-determined ramp rates for increasing or decreasing the power level.

Figure 3:
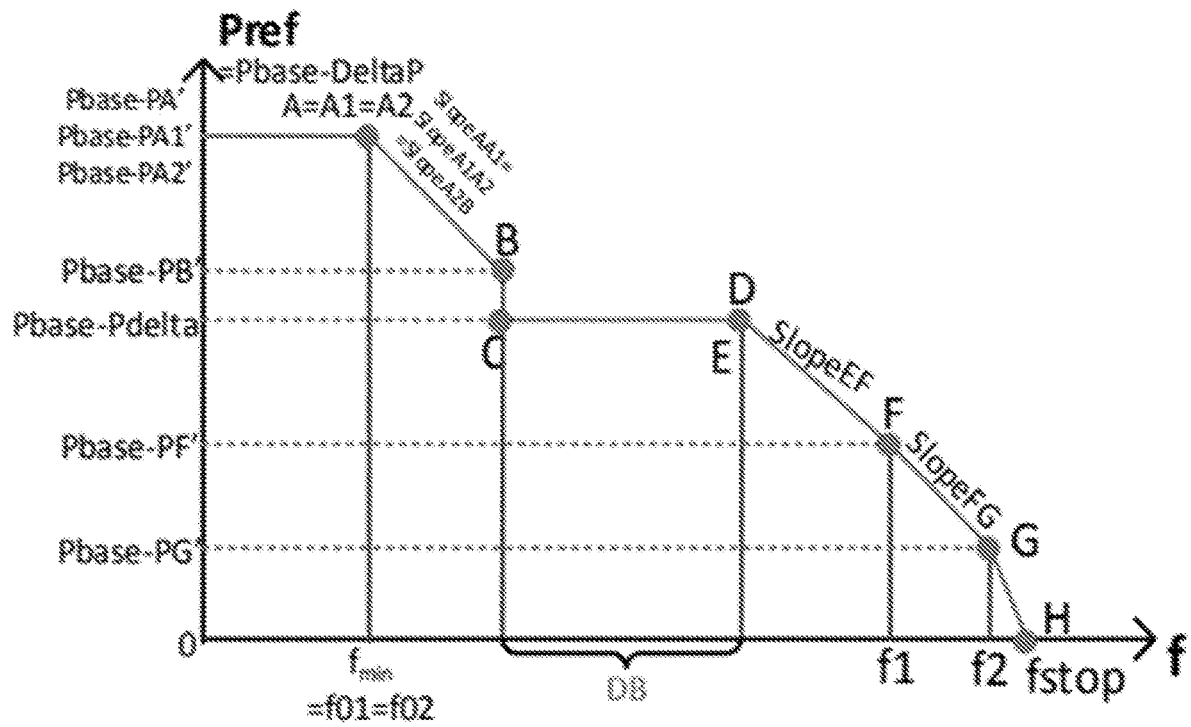
FIG. 3 shows an example P-f curve of the control module of FIG. 2.

For example, the look-up table 102 may include a P-f curve for matching the frequency level measurement, (f), to a respective active power target value, P(f). By way of illustration, an example P-f curve of the type that the skilled person will be familiar with is shown in FIG. 3.

The example P-f curve shows a frequency deadband, DB, defining a frequency range over which the active power target value, P(f), is substantially constant. The example P-f curve also shows a prescribed increase in the active power target value, P(f), when the frequency level falls below the frequency deadband, DB, (during an underfrequency event) and a prescribed decrease in the active power target value, P(f), when the frequency level rises above the frequency deadband, DB, (during an overfrequency event).

As shown in this example, the prescribed increase, and/or decrease, of the active power target value, P(f), may include a step change in the active power target value, P(f), and/or one or more different slopes defining the change in the active power target value, P(f), as the frequency level deviates further from the frequency deadband, DB. For example, the P-f curve may be divided into a series of frequency bands and the slope of the P-f curve may increase or decrease in successive frequency bands as the frequency level deviates further from the frequency deadband, DB. Additionally, in some examples, the P-f curve may also include a minimum, and/or a maximum, frequency level, beyond which the active power target value, P(f), may be held substantially constant, as shown in FIG. 3.

The look-up table 102 may additionally, or alternatively, include pre-determined ramp rates in the form of one or more predetermined ramp up rates, and/or ramp down rates, for respectively increasing or decreasing the power level according to respective conditions of the WPP 12 and/or the grid 16. For example, the look-up table 102 may include one or more predetermined ramp up, or ramp down rates, corresponding to respective frequency level measurements, changes in the measured frequency level, the power level, and/or active power target values, such as an active power target values corresponding to the measured frequency level.

By way of example, during an overfrequency event, the control module 100 may be configured to access the look-up table 102 to determine a respective ramp down rate for reducing the power level (and hence the active power set points) proportionally to a respective increase in the measured frequency level. In this manner, the control module 100 may support the main grid 16 in returning to the frequency deadband by controlling the WTGs 14 to produce less active power. Subsequently, as the measured frequency level returns towards the frequency deadband, the control module 100 may be configured to compare the power level to the baseline value and to determine a ramp-up rate from the look-up table 102 (based on the comparison) in order to restore the power level towards the baseline value.

Various methods are known in the art for determining active power set points based on the measured frequency level of the connected grid 16 deviating from the contingency deadband, and it shall be appreciated that the above examples are not intended to be limiting on the scope of the invention.

It may be advantageous to further control a power characteristic of the power plant based upon varying measured network frequency within the contingency deadband. For example, the contingency deadband can be partitioned into one or more sub-bands, each of which overlaps the contingency deadband. In some implementations, each of the one or more sub-bands is completely contained within the contingency deadband. Alternatively, one or more sub-bands may extend beyond the contingency deadband.

Figure 4:
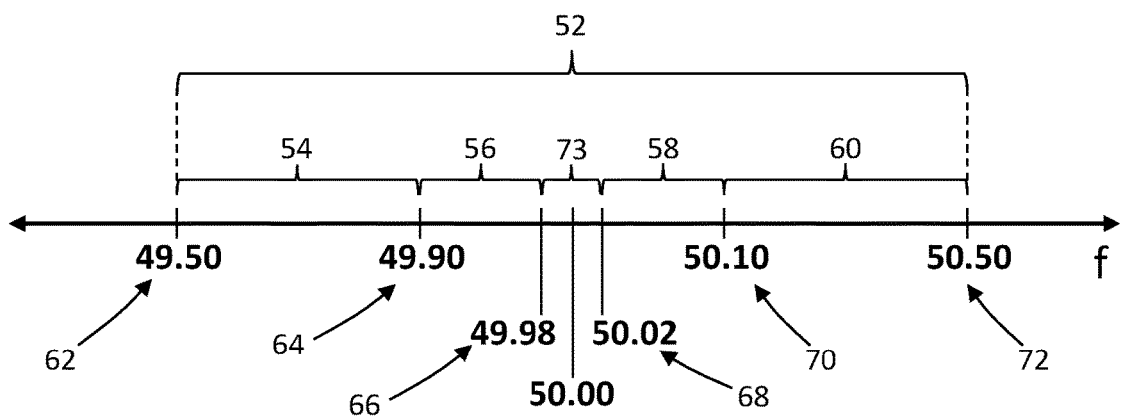
FIG. 4 shows an example partitioning of a frequency contingency deadband into several sub-band.

FIG. 4 is a P-f graph showing a contingency deadband 52 that has been partitioned into four frequency sub-bands: a first sub-band 54, a second sub-band 56, a third sub-band 58, and a fourth sub-band 60.

First sub-band 54 extends from a first frequency 62 at the lower end of contingency deadband 52 to a higher second frequency 64 within contingency deadband 52. Second sub-band 56 extends from second frequency 64 to a higher third frequency 66. Third sub-band 58 extends from a fourth frequency 68 to a higher fifth frequency 70. Fourth sub-band 60 extends from fifth frequency 70 to a higher sixth frequency 72 at the higher end of contingency deadband 52.

A region 73 between third frequency 66 and fourth frequency 68 does not form part of any of the sub-bands. In other implementations, region 73 may be wider or narrower than illustrated, or may be omitted, such that third frequency 66 and fourth frequency 68 are the same.

Although first frequency 62 falls on the lower boundary of contingency deadband 52, and sixth frequency 72 falls on the higher boundary of contingency deadband 52, the skilled person will appreciate that first sub-band 54 and/or fourth sub-band 60 may at least partially fall outside contingency deadband 52, in other implementations.

Figure 5:
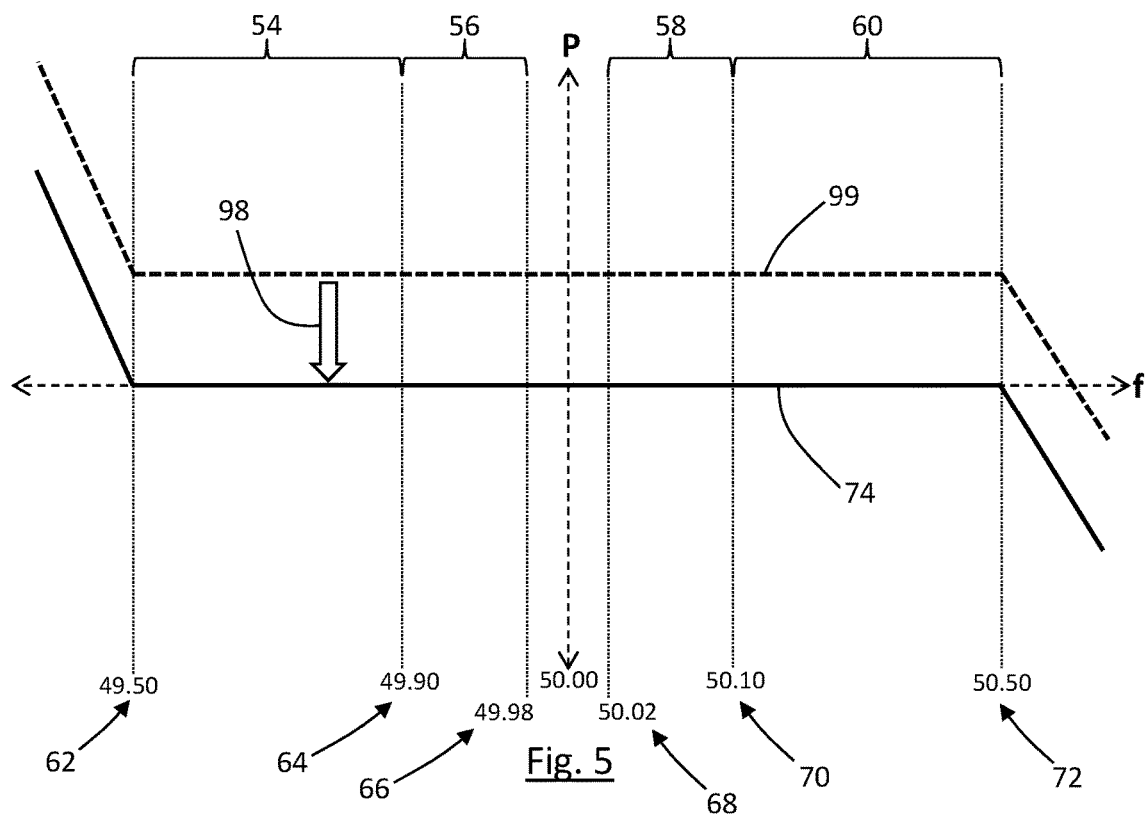
FIG. 5 shows a baseline P-f curve.

FIG. 5 is a graph showing a baseline curve in the form of a baseline P-f curve 74 that maps network frequency to active power set points of WPP 12. Baseline P-f curve 74 is shown as a simplified version of the curve shown in FIG. 3, for the sake of clarity. The first to fourth sub-bands 54-60 are marked along the frequency axis.

Baseline P-f curve 74 is a constant value for network frequency values that fall within contingency deadband 52, ramps up as the network frequency falls below contingency deadband 52, and ramps down as the network frequency rises above contingency deadband 52, in accordance with the general principles above.

The output power represented by baseline P-f curve 74 varies as the available output power of WPP 12 varies. The value of baseline P-f curve 74 within contingency deadband 52 may correspond to an estimate of the available active power for the WPP 12 to supply to the main grid 16, such as a maximum 'rated' amount of power that could potentially be supplied to the main grid 16 under current conditions, such as wind speed conditions.

For example, as wind speed falls, the maximum available power output of wind turbines 14 also falls. This effectively offsets baseline P-f curve 74 downwards along the vertical axis. The converse happens as wind speed rises. Within a certain range of wind speeds, baseline P-f curve 74 will remain the same general shape, but will be offset up and down along the vertical axis based on wind speed and other network operational requirements known to those skilled in the art.

WPP 12 can be operated on the basis of baseline P-f curve 74 during an ordinary operation mode. When it is desired to provide frequency support to main grid 16 within one or more of sub-bands 54-60, one or more corresponding offset curves may be used in conjunction with baseline P-f curve 74, in order to provide set points to WPP 12 that provide the required frequency support.

Figure 6:
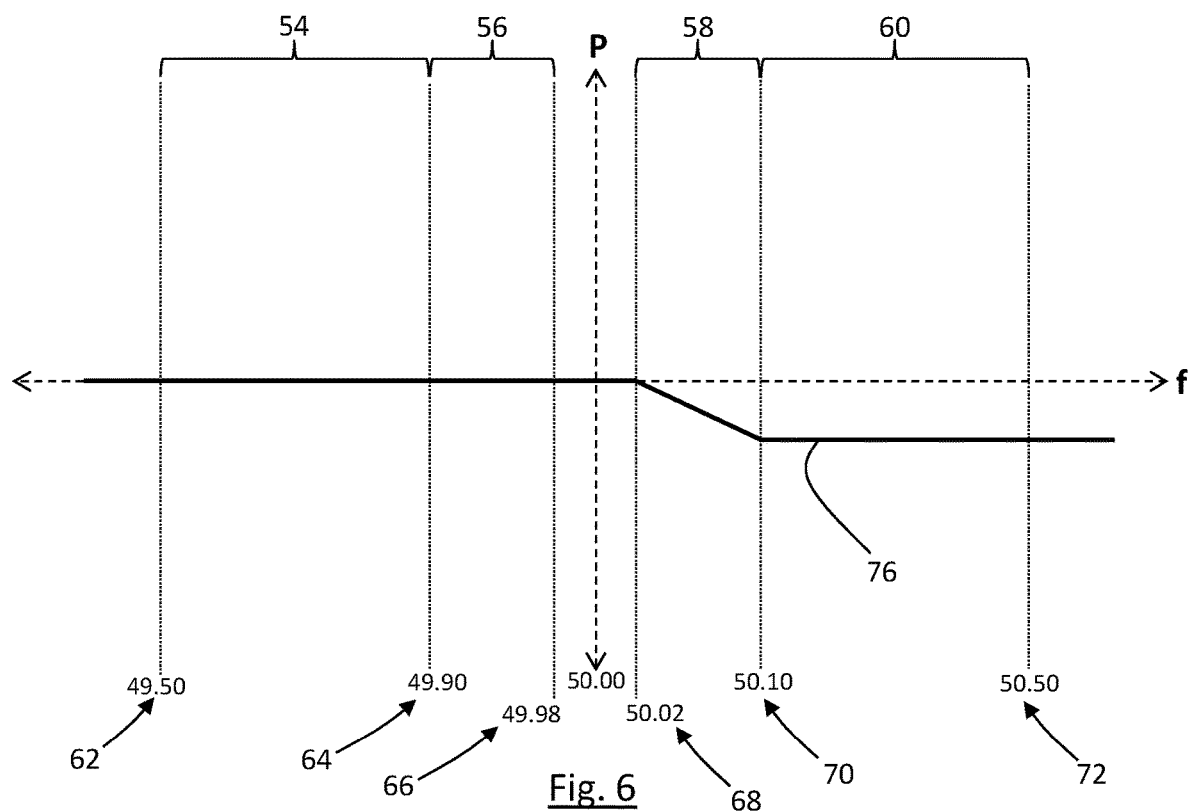
FIG. 6 shows a P-f offset curve.

For example, FIG. 6 is a P-f graph showing a first P-f offset curve 76, which is applied when it is intended to provide frequency support within third sub-band 58. First P-f offset curve 76 has a value of zero below fourth frequency 68, ramps downwards to a value of −1 MW at fifth frequency 70, and has a value of −1 MW above fifth frequency 70. The skilled person will appreciate that the offset value of −1 MW is given merely as an example. The actual offset value for any particular implementation will be chosen based upon factors such as the power generation capacity of WPP 12, local network conditions, and other commercial and technical factors that will be understood by the skilled person.

Figure 7:
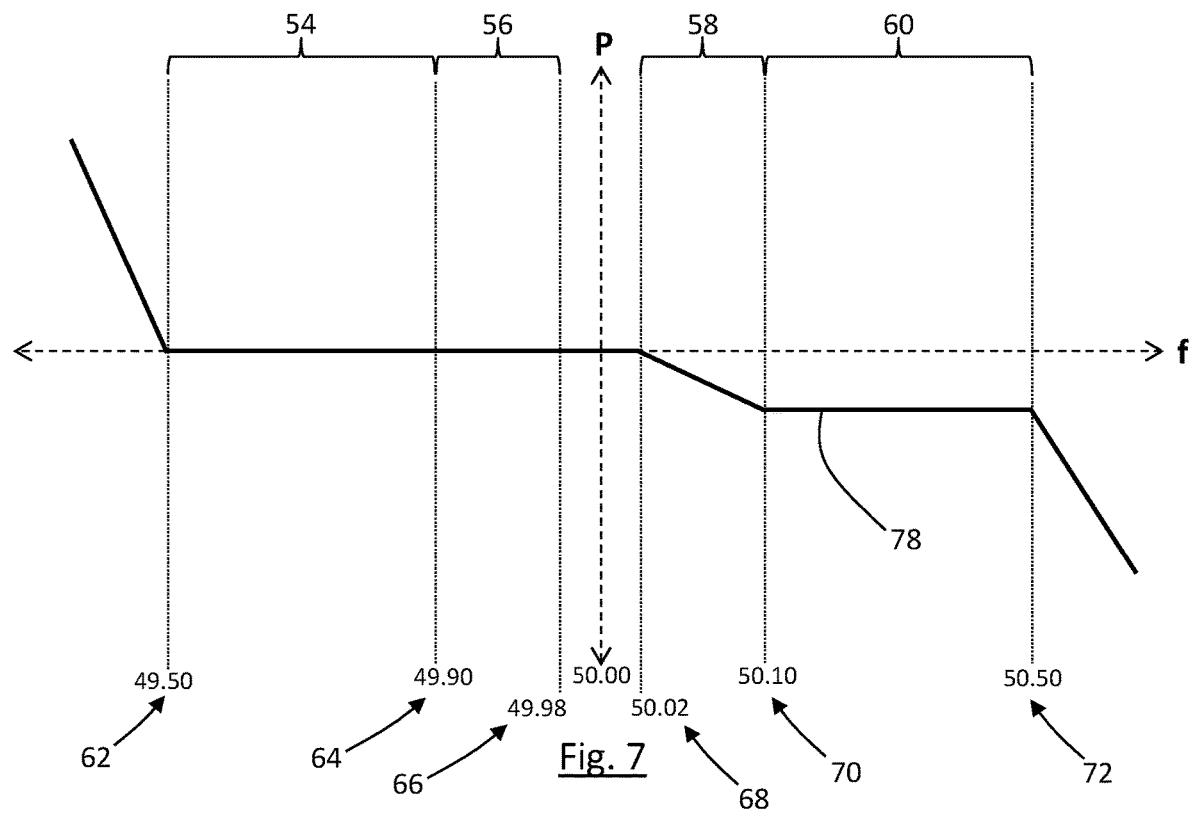
FIG. 7 shows an output P-f curve based on the P-f offset curve of FIG. 6.

FIG. 7 is a P-f graph showing a first output P-f curve 78 that is the sum of baseline P-f curve 74 (from FIG. 5) and first P-f offset curve 76 (from FIG. 6). First output P-f curve 78 is the same as that of baseline P-f curve 74 at network frequencies below fourth frequency 68. The effect above fifth frequency 70 is that baseline P-f curve 74 is offset downwards by 1 MW.

First output P-f curve 78 is used to generate set points for WPP 12. If the measured network frequency increases above fourth frequency 68, the values of the power characteristic setpoints dispatched to WPP 12 are gradually ramped downwards as the frequency increases through third sub-band 58. In the case of a wind power plant, this can mean feathering turbine blades, controlling a power converter, or otherwise reducing the total amount of power generated. The value of the power characteristic setpoints dispatched to WPP 12 is then held constant as the measured network frequency increases through fourth sub-band 60 and is then further ramped downwards as the measured network frequency increases above sixth frequency 72.

Figure 8:
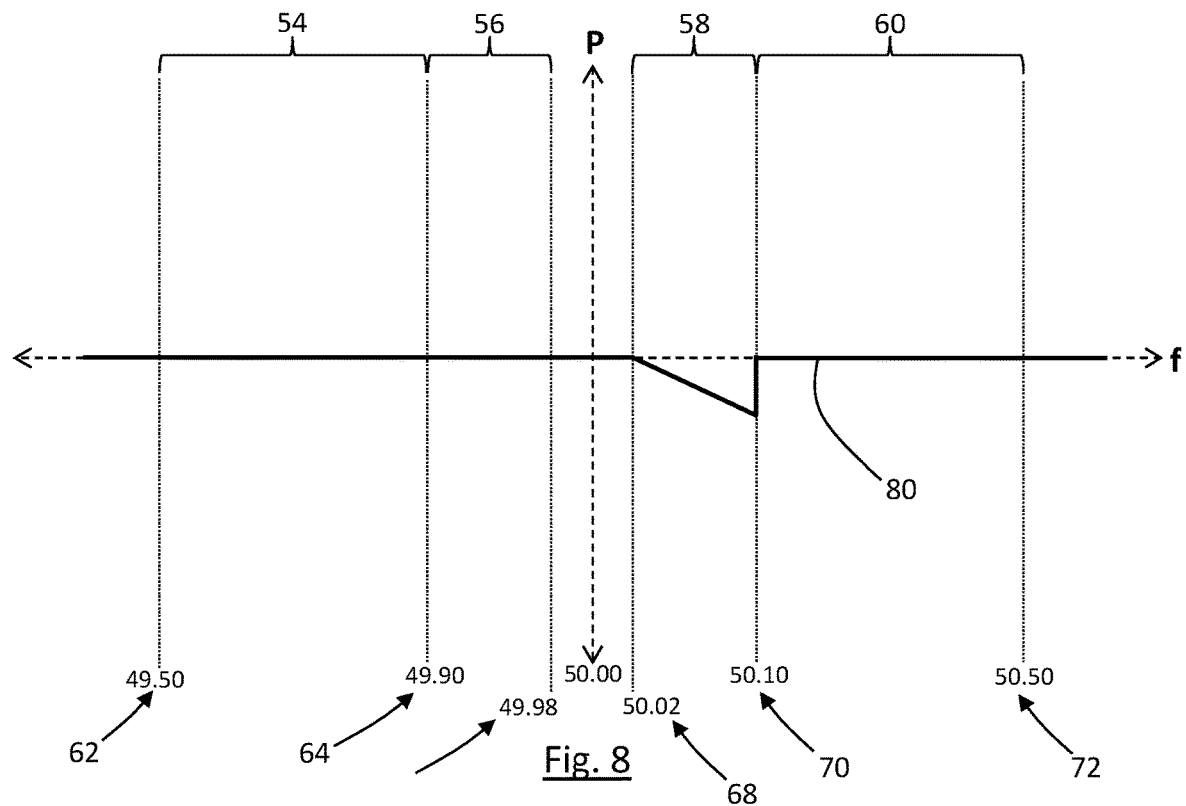
FIG. 8 shows a further P-f offset curve.

FIG. 8 is a P-f graph showing a second P-f offset curve 80. Second P-f offset curve 80 is similar to first P-f offset curve 76, in that it is applied when it is intended to provide frequency support within third sub-band 58. Second P-f offset curve 80 is the same as first P-f offset curve 76 for network frequencies below fifth frequency 70. However, as the network frequency rises above fifth frequency 70, the value of second P-f offset curve 80 returns to zero.

Figure 9:
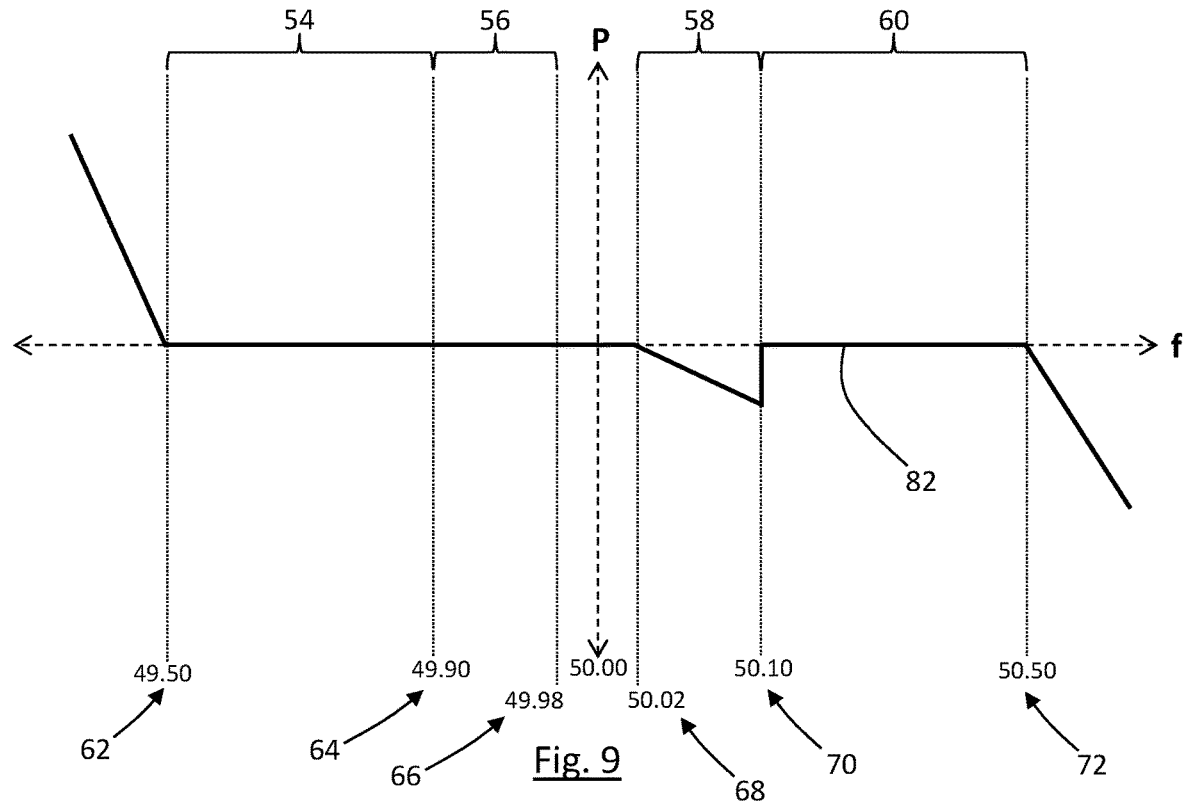
FIG. 9 shows an output P-f curve based on the P-f offset curve of FIG. 8.

FIG. 9 is a P-f graph showing a second output P-f curve 82 that is the sum of baseline P-f curve 74 (from FIG. 5) and second P-f offset curve 80 (from FIG. 8). Second output P-f curve 82 is the same as that of first output P-f curve 78 at network frequencies below fifth frequency 70. However, for network frequencies above fifth frequency 70, baseline P-f curve 74 is not offset as was the case in first output P-f curve. As a result, WPP 12 is able to generate more power in this region than is the case in the first output P-f curve 78.

The choice between applying first P-f offset curve 76 or second P-f offset curve 80 may be guided or controlled by commercial arrangements between the operator of WPP 12, network rules, and other factors that will be understood by the skilled person.

First P-f offset curve 76 and second P-f offset curve 80 can be modified in any desirable manner, as will be understood by the skilled person. For example, the angle of the ramp within third sub-band 58, and the maximum offset caused by first P-f offset curve 76 and second P-f offset curve 80 can be increased or decreased.

Figure 10:
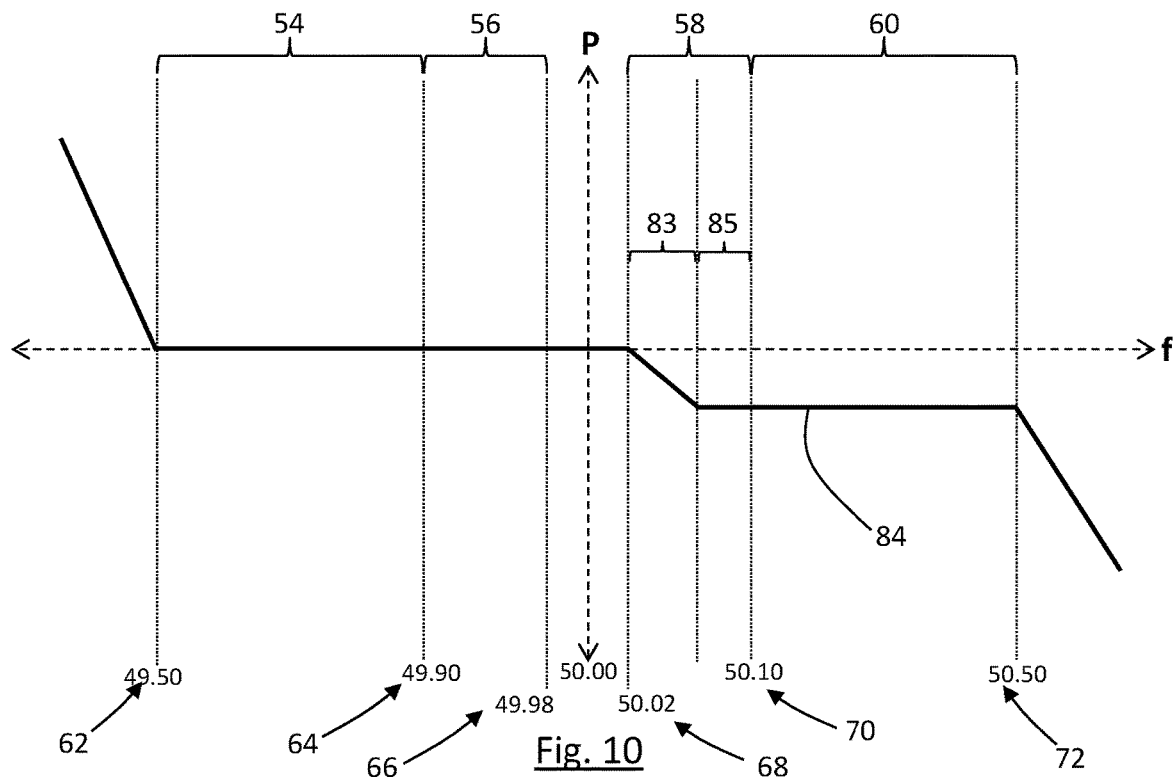
FIG. 10 shows an output P-f curve based on a further P-f offset curve.

Similarly, the shape of the first P-f offset curve 76 and second P-f offset curve 80 within third sub-band 58 can be modified in different implementations. For example, FIG. 10 is a P-f graph showing a third P-f offset curve 84. Within third sub-band 58, third P-f offset curve 84 includes a ramp portion 83 and a constant portion 85.

Yet other modifications can include introducing ramped portions to avoid aggressive step changes in power outputs as a result of a small frequency change. Alternatively, or in addition, potential negative effects of such step changes may be controlled or mitigated in accordance with a maximum rate of change applied by PPC 22 or WTG controllers 15.

Figure 11:
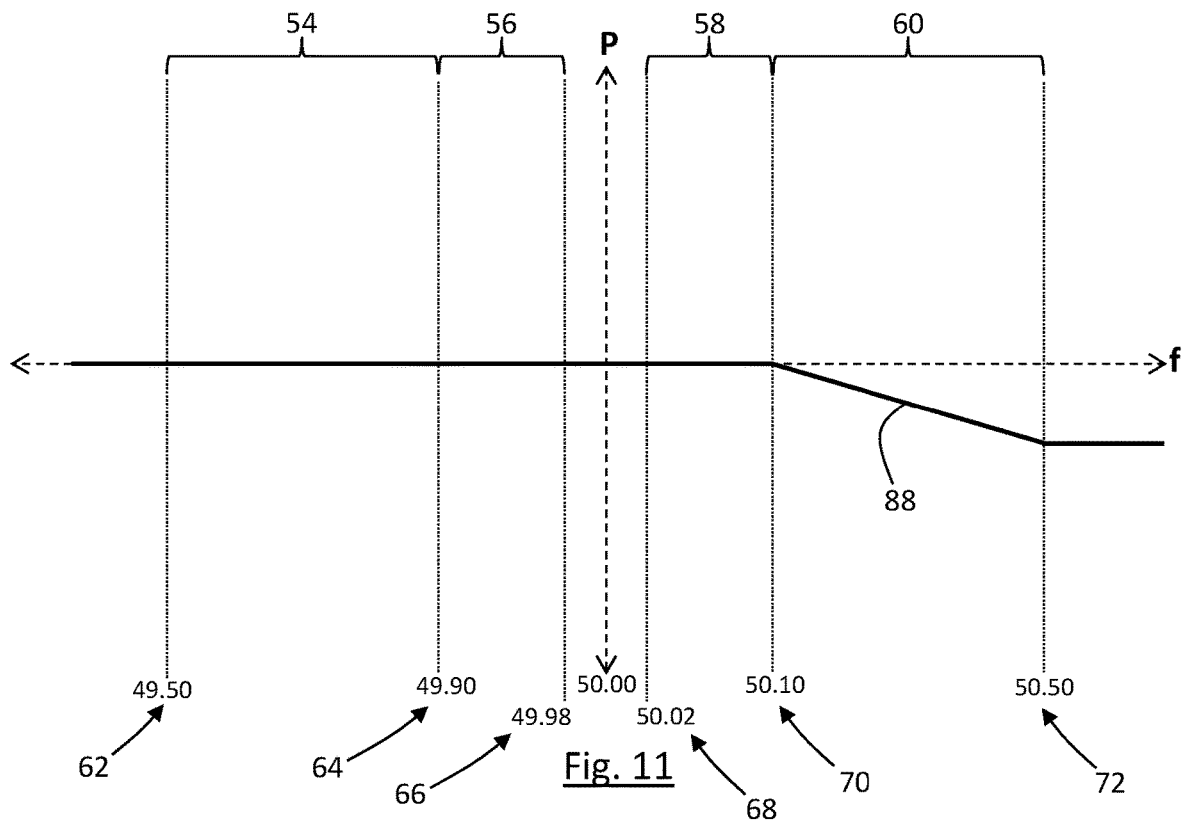
FIG. 11 shows a further P-f offset curve.

FIG. 11 is a P-f graph showing a fourth P-f offset curve 88, which is applied when it is intended to provide frequency support within fourth sub-band 60. Fourth P-f offset curve 88 has a value of zero below fifth frequency 70, ramps downwards to a value of −1 MW at sixth frequency 72, and has a value of −1 MW above sixth frequency 72. The skilled person will appreciate that the offset value of −1 MW is given merely as an example. The actual offset value for any particular implementation will be chosen based upon factors such as the power generation capacity of WPP 12, local network conditions, and other commercial and technical factors that will be understood by the skilled person.

Figure 12:
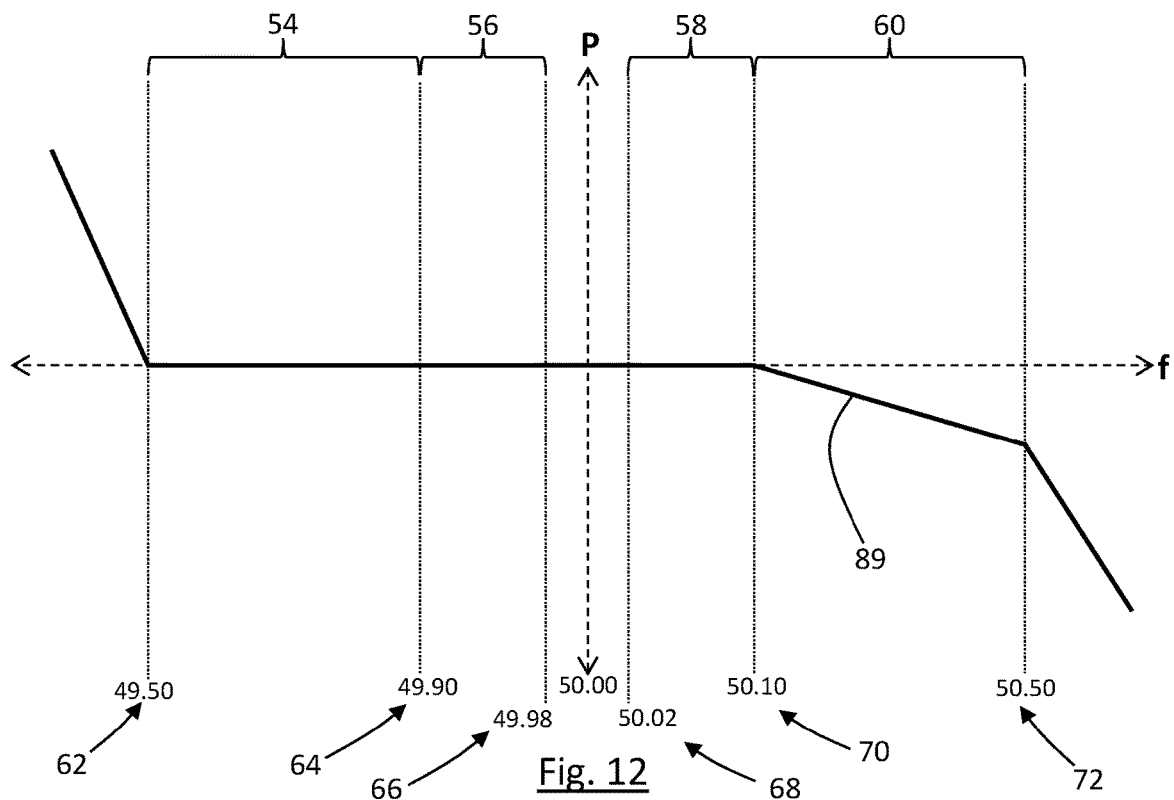
FIG. 12 shows an output P-f curve based on the further P-f offset curve of FIG. 11.

FIG. 12 is a P-f graph showing a third output P-f curve 89 that is the sum of baseline P-f curve 74 (from FIG. 5) and fourth P-f offset curve 88 (from FIG. 10). Third output P-f curve 89 is the same as that of baseline P-f curve 74 at network frequencies below fifth frequency 70. The effect above sixth frequency 72 is that baseline P-f curve 74 is offset downwards by 1 MW.

Third output P-f curve 89 is used to generate set points for WPP 12. If the measured network frequency increases above fifth frequency 70, the values of the power characteristic setpoints dispatched to WPP 12 are gradually ramped downwards as the frequency increases through fourth sub-band 60. In the case of a wind power plant, this can mean feathering turbine blades, controlling a power converter, or otherwise reducing the total amount of power generated. As the measured network frequency increases past sixth frequency 72 at the upper bound of fourth sub-band 60, the values of the power characteristic setpoints dispatched to WPP 12 are further ramped downwards, due to the downward slope of the baseline P-f curve in this region.

FIG. 13 is a P-f graph showing a fifth P-f offset curve 90. Fifth P-f offset curve 90 is similar to fourth P-f offset curve 88, in that it is applied when it is intended to provide frequency support within fourth sub-band 60. Fifth P-f offset curve 90 is the same as first P-f offset curve 76 for network frequencies below sixth frequency 72. However, as the network frequency rises above sixth frequency 72, the value of fifth P-f offset curve 90 returns to zero.

FIG. 14 is a P-f graph showing a fourth output P-f curve 91 that is the sum of baseline P-f curve 74 (from FIG. 5) and fifth P-f offset curve 90 (from FIG. 13). Fourth output P-f curve 91 is the same as that of third output P-f curve 89 at network frequencies below sixth frequency 72. However, for network frequencies above sixth frequency 72, baseline P-f curve 74 is not offset as was the case in third output P-f curve. As a result, WPP 12 is able to generate more power in this region than is the case in the third output P-f curve 89.

The choice between applying third P-f offset curve 89 or fourth P-f offset curve 91 may be guided or controlled by commercial arrangements between the operator of WPP 12, network rules, and other factors that will be understood by the skilled person. That said, the skilled person will appreciate that fifth P-f offset curve 90 of FIG. 13 (and hence fourth output P-f curve 91 of FIG. 14) may not be allowed under grid rules. Increasing the power supplied to the grid at a time when the grid frequency is leaving the frequency contingent deadband 52 increases the stress experienced by the grid, which is the opposite of what is desirable. Nevertheless, it is given as an example for the purpose of technical explanation.

As with first P-f offset curve 76 and second P-f offset curve 80, fourth P-f offset curve 88 and fifth P-f offset curve 90 can be modified in any desirable manner, as will be understood by the skilled person. For example, the angle of the ramp within fourth sub-band 60, and the maximum offset caused by fourth P-f offset curve 88 and fifth P-f offset curve 90 can be increased or decreased.

Similarly, the shape of the fourth P-f offset curve 88 and fifth P-f offset curve 90 within fourth sub-band 60 can be modified in different implementations, such as by including a ramp portion and a constant portion similar to those described in relation to FIG. 10.

Figure 15:
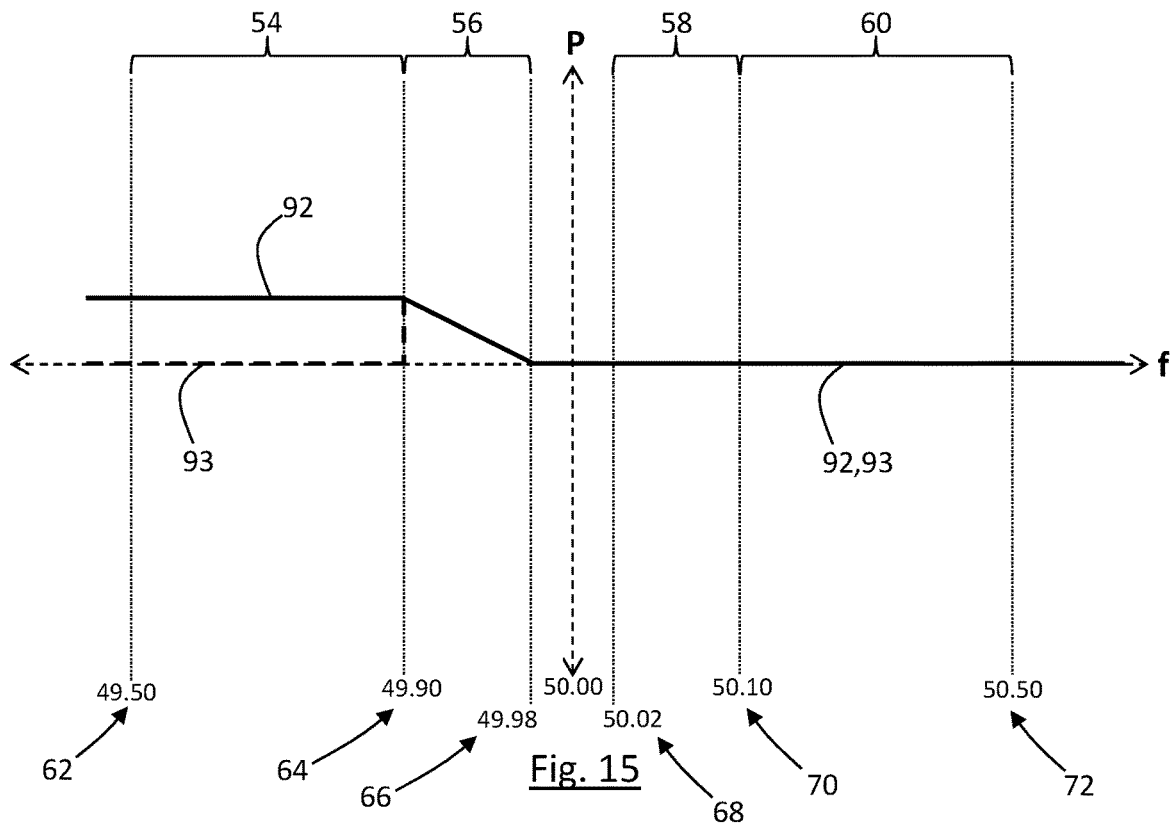
FIGS. 15 and 16 show further P-f offset curves.

FIG. 15 is a P-f graph showing a sixth P-f offset curve 92, which is applied when it is intended to provide frequency support within second sub-band 56. Sixth P-f offset curve 92 has a value of zero above third frequency 66, ramps upwards to a value of +1 MW at second frequency 64, and has a value of +1 MW below second frequency 64. The skilled person will appreciate that the offset value of +1 MW is given merely as an example. The actual offset value for any particular implementation will be chosen based upon factors such as the power generation capacity of WPP 12, local network conditions, and other commercial and technical factors that will be understood by the skilled person.

FIG. 15 also shows a seventh P-f offset curve 93 (dashed line), which is the same as sixth P-f offset curve 92 for frequencies above second frequency 64, but has a constant value of zero for frequencies below second frequency 64.

Figure 16:
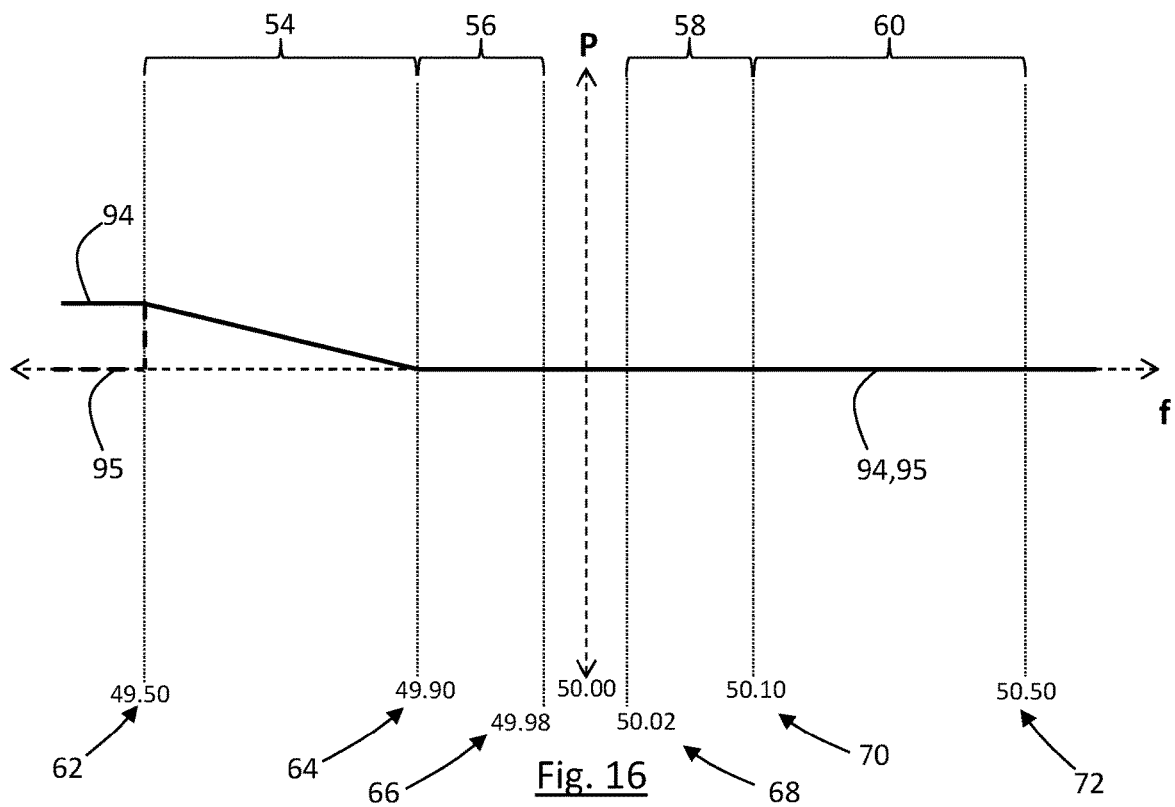

FIG. 16 is a P-f graph showing an eighth P-f offset curve 94, which is applied when it is intended to provide frequency support within first sub-band 54. Eighth P-f offset curve 94 has a value of zero above second frequency 64, ramps upwards to a value of +1 MW at first frequency 62, and has a value of +1 MW below first frequency 62. The skilled person will appreciate that the offset value of +1 MW is given merely as an example. The actual offset value for any particular implementation will be chosen based upon factors such as the power generation capacity of WPP 12, local network conditions, and other commercial and technical factors that will be understood by the skilled person.

FIG. 16 also shows a ninth P-f offset curve 95 (dashed line), which is the same as eighth P-f offset curve 94 for frequencies above first frequency 62, but has a constant value of zero for frequencies below first frequency 62.

Any of sixth P-f offset curve 92, seventh P-f offset curve 93, eighth P-f offset curve 94, and ninth P-f offset curve 95 can be applied to baseline P-f curve 74 in a similar manner to that described in relation to first output P-f curve 78, second output P-f curve 82, and third P-f output curve 89, to generate one or more further output P-f curves. Such further output curves can be used to generate set points for dispatch to WTG controllers 15.

The choice of which P-f offset curves to apply to baseline P-f curve 74 may be guided or controlled by commercial arrangements between the operator of WPP 12, network rules, and other factors that will be understood by the skilled person.

Any or all of sixth to ninth P-f offset curves 92, 93, 94, 95 can be modified in any desirable manner, as will be understood by the skilled person. For example, the angle of the ramp within any off corresponding sub-bands 54 and 56, and the maximum offset caused by the P-f offset curves, can be increased or decreased.

Similarly, the shape of any or all of sixth to ninth P-f offset curves 92, 93, 94, 95 within first sub-band 54 and second sub-band 56 can be modified in different implementations.

Yet other modifications can include introducing ramped portions to avoid aggressive step changes (e.g., between third sub-band 58 and fourth sub-band 60 in FIG. 8) in power outputs as a result of a small frequency change. Alternatively, or in addition, potential negative effects of such step changes may be controlled or mitigated in accordance with a maximum rate of change applied by PPC 22 or WTG controllers 15.

The skilled person will appreciate that any combination P-f offset curves can be applied, to any combination of the sub-bands.

In particular, control module 100 is configured to implement a method for controlling a power plant, which will now be described with reference to FIG. 17.

Figure 17:
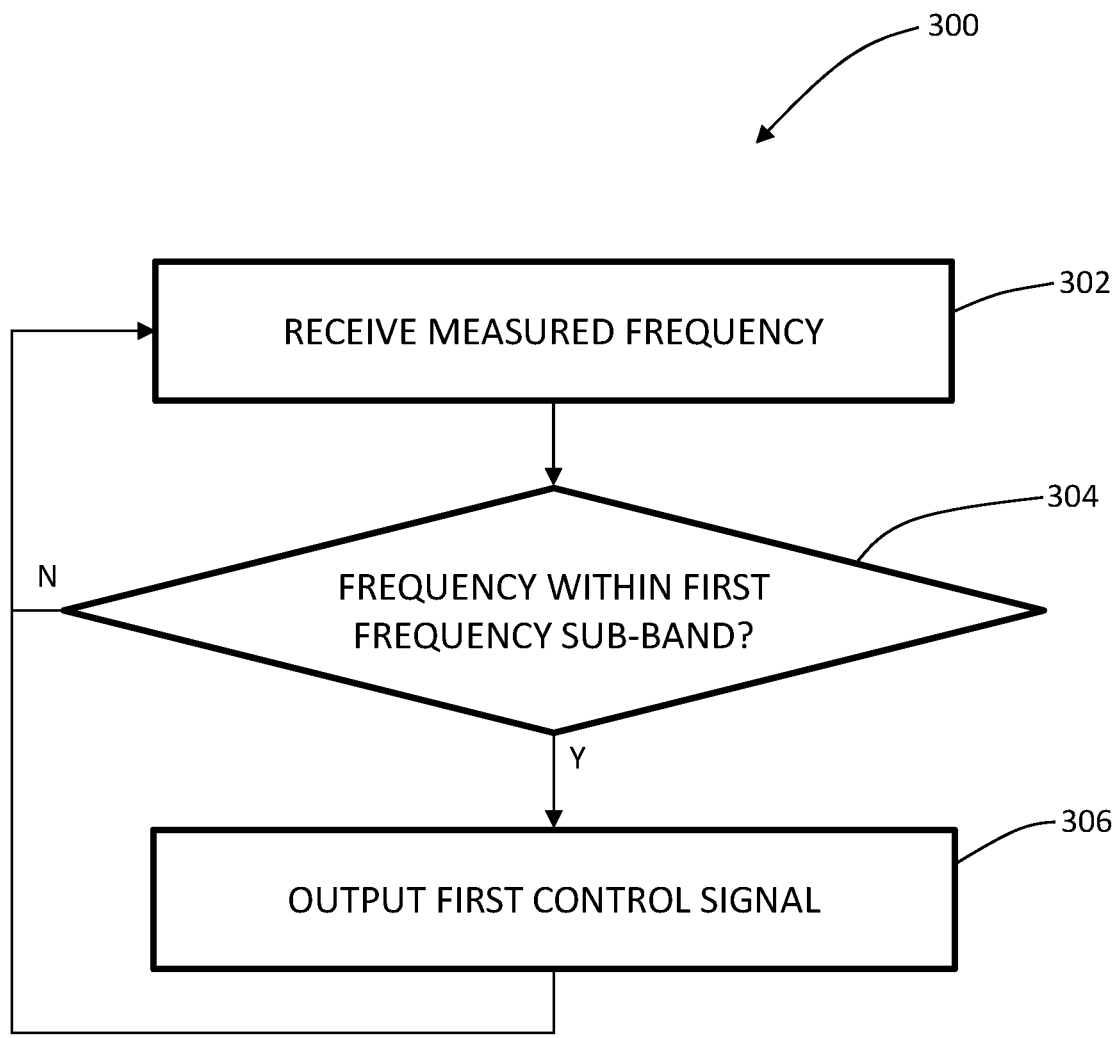
FIG. 17 shows a method of controlling a power plant.

FIG. 17 shows a method 300 for controlling a power plant, such as WPP 12. In this initial example, the method is applied to only a single frequency sub-band. That sub-band can be the sole sub-band within which the method is applied, or can be one of several sub-bands that overlap the network-defined contingency deadband, any or all of which can be implemented by the operator of WPP 12.

Method 300 comprises receiving 302 a measured frequency of main grid 16, and then determining 304 whether the measured frequency falls within a first frequency sub-band.

If it is determined that the measured frequency falls within the first sub-band, then a first control signal is output 306, and the method returns to step 302.

If the measured frequency does not fall within the first sub-band, then the method returns to step 302.

Depending upon the implementation, the first control signal can be indicative of either a first power offset or a set point for controlling a power characteristic of the power plant, where the setpoint incorporates a first power offset. Various implementation options are described in more detail below with reference to FIGS. 18-20.

The first power offset can be positive if the measured frequency is lower than a nominal operating frequency of the power network, and negative if the measured frequency is higher than the nominal operating frequency of the power network.

Optionally, a value of the first power offset at the second frequency is zero, such that there is a stepless transition in set points as the measured frequency drops below the second frequency. Non-limiting examples of such a transition are the sixth and seventh offset curves 92 and 93 (FIG. 15) at third frequency 66, and the eighth and ninth offset curves 94 and 95 (FIG. 16) at second frequency 64.

Optionally, as the measured network frequency falls from the second frequency towards the first frequency while steps 302 and 304 are repeated, the first power offset:

ramps up in value over a first frequency range; and remains constant or ramps up at a lower rate over a second frequency range that is lower than the first frequency range.

The first frequency range can be continuous with the second frequency range, and the first and second frequency ranges can cover the whole of the first sub-band.

The method optionally comprises determining whether the measured frequency falls within a second frequency sub-band, the second frequency sub-band overlapping the network-defined frequency deadband. Responsive to the measured frequency falling within the second sub-band, and based at least in part on the measured frequency, the method comprises outputting a second control signal indicative of either a second power offset or a set point for controlling the power characteristic of the power plant, the set point being based on the second power offset applied to the baseline frequency curve for the power plant.

Optionally, and similar to the first frequency sub-band, there is a stepless transition in set points as the measured frequency enters the second frequency sub-band from a lower frequency.

Also similar to the first frequency sub-band, as the measured network frequency rises within the second frequency sub-band, the first power offset can ramp down in value over a third frequency range and then remain constant or ramp down at a lower rate over a fourth frequency range that is higher than the third frequency range. The third frequency range can be continuous with the fourth frequency range, and the third and fourth frequency ranges can cover the whole of the second sub-band.

One or more further sub-bands may be defined within the contingency deadband, each further sub-band being within the network-defined frequency deadband but not overlapping any other sub-band. The method can then comprise, responsive to the measured frequency falling within a further sub-band, and based at least in part on the measured frequency, dispatching a further control signal indicative of either:
- a further power offset, for application to the baseline frequency curve for the power plant to generate a set point for controlling the power characteristic of the power plant; or
- a set point for controlling the power characteristic of the power plant, the set point being based on a further power offset applied to a baseline frequency curve for the power plant.

In some implementations, different frequency support modes may be supported. For example, in one implementation, the operator of PPC 22 may switch between a baseline mode, in which baseline P-f curve 74 is used to generate set points in response to the measured frequency of grid 16, and a frequency support mode, in which any combination of the offset curves of the first to fourth sub-bands 54-60 are applied for frequencies within contingency deadband 52.

Figure 18:
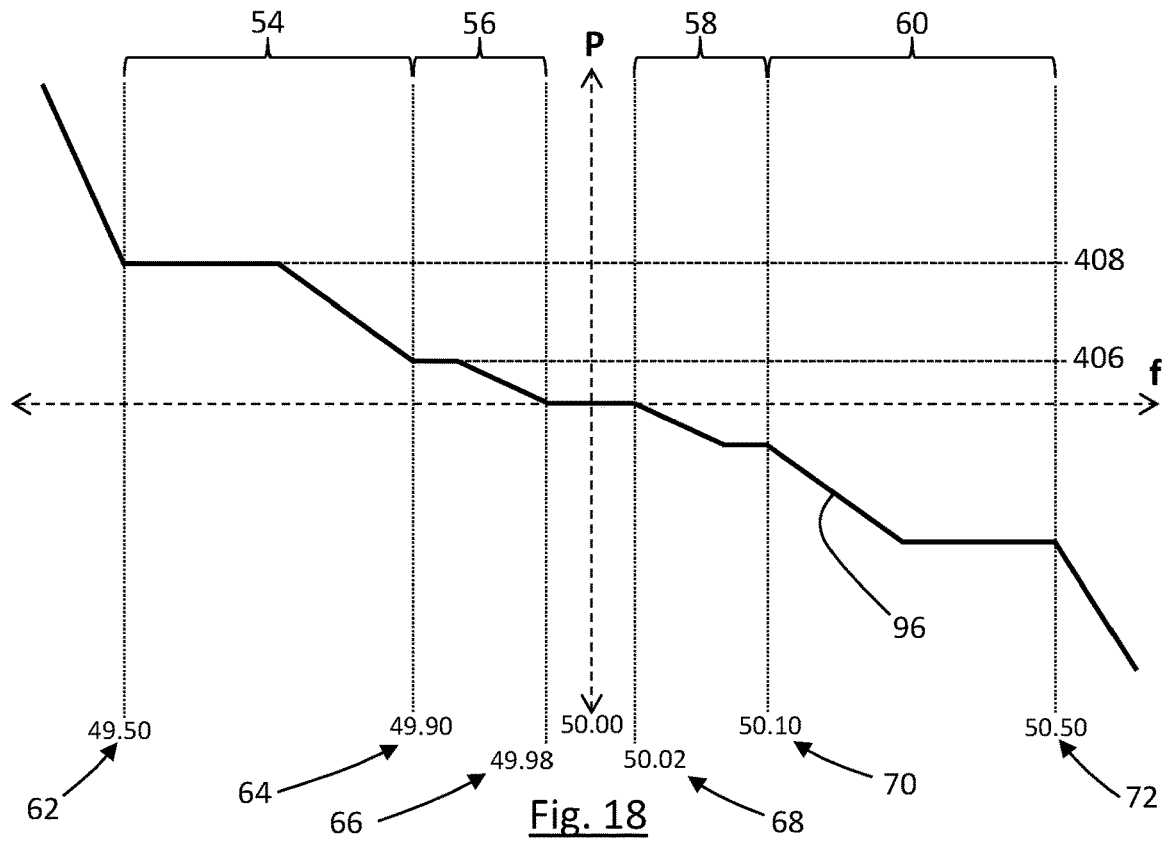
FIGS. 18 and 19 show further output P-f curves.

FIG. 18 shows an output P-f curve 96 that has been generated by summing baseline P-f curve 74 and individual offset curves for each of the first to fourth sub-bands 54-60. Output P-f curve 96 is used when the operator of PPC 22 chooses to provide frequency support over all of the first to fourth sub-bands 54-60, which may be as a result of negotiation with grid operator 26, a commercial bidding process, or the like.

Figure 19:
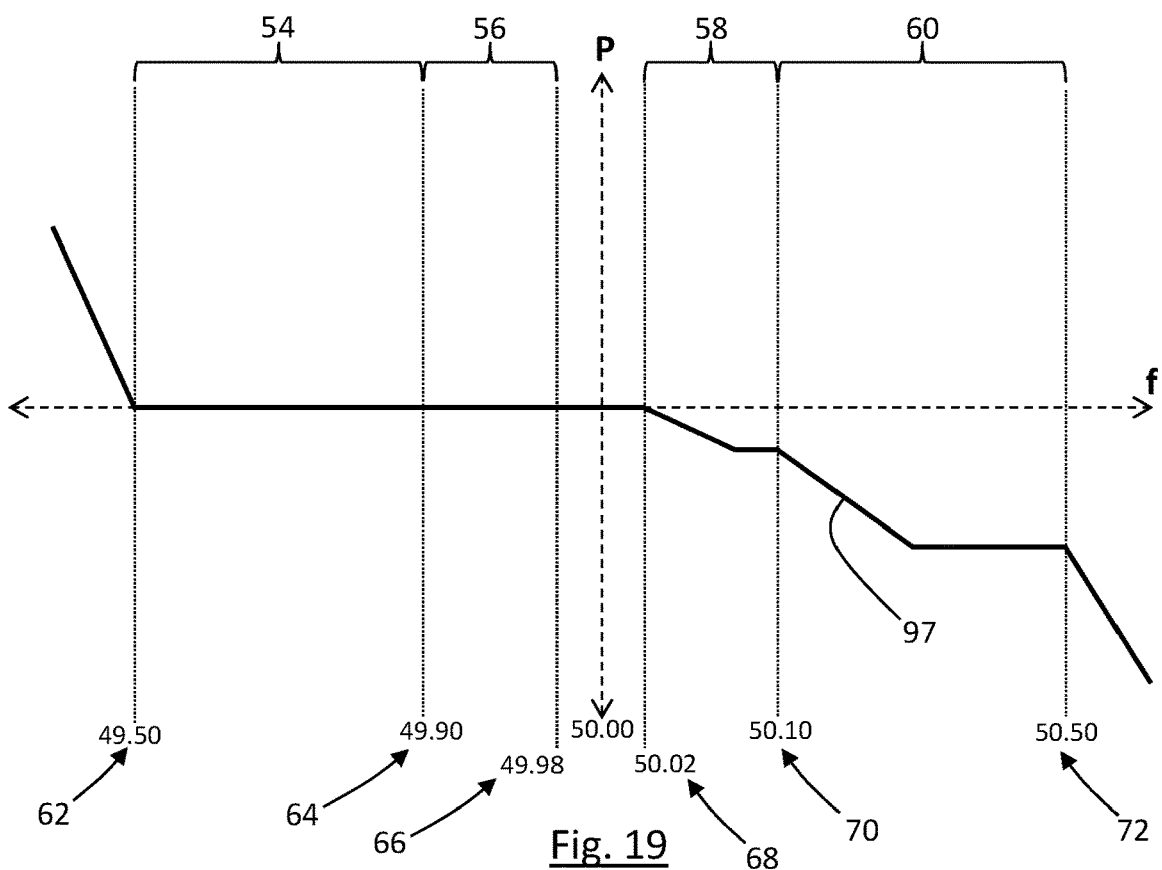

In an alternative implementation, the operator of PPC 22 may choose to provide frequency support over only a subset of possible sub-bands. For example, the operator of PPC 22 may choose to provide frequency support over only the third and fourth frequency bands. FIG. 19 shows an output P-f curve 97 for providing such support, which has been generated by summing baseline P-f curve 74 and individual offset curves for each of the third and fourth sub-bands 58 and 60.

In the FIGS. 18 and 19 examples, each of the sub-band offset curves includes a ramp portion (similar to ramp portion 83 shown in FIG. 10) and a constant portion (similar to constant portion 85 shown in FIG. 10). However, the skilled person will appreciate that each individual offset curve can have any shape and/or slope angle, in any combination. For example, some sub-band offset curves may employ a constant portion while others do not.

Optionally, the shape of each sub-band offset curve may be fixed, in which case the operator of PPC 22 need only choose which, if any, sub-band offset curves to implement at any particular time. Alternatively, the shape of some or all of the sub-band offset curves may be varied as required over time.

It should be understood that the term "offset" is used broadly. For example, "offset" includes a literal offset in the sense of a value that is applied to a baseline curve. For example, an offset can be a positive or negative value (or in the case of an offset curve, a curve or set of positive or negative values) that is added to, subtracted from, or otherwise applied to a baseline P-f curve to provide the described frequency support.

"Offset" also includes an arrangement in which PPC 22 is programmed to implement a single P-f output curve, the shape of which can be changed by adjusting program parameters. The parameters can optionally be adjustable such that the P-f curve within any or all of the sub-bands is offset as required. The parameters can also be set such that no frequency support is provided in any of the sub-bands. The net result is that a single, adjustable P-f curve is used, and only the parameter settings determine whether frequency support is provided in any sub-band. The net effect is an offset relative to a baseline curve, even if a separate individual offset is not directly added to or subtracted from a separate baseline P-f curve.

In addition to coping with the variability of the available power output by WPP 12 due to the unpredictable nature of its energy source, it may also be necessary to modify the power output in order to ensure that any contractual or network-rule based requirements are met when providing frequency support services.

When not providing frequency support services such as those described herein, WPP 12 may operate with a certain amount of spinning reserve, which may be a requirement of grid operator 26. Spinning reserve effectively curtails the output power of a power generator or powerplant below its current theoretical maximum power output in the current generation conditions, by some offset. The offset is effectively power held in reserve unless and until it is required. For example, it may involve WPP 12 under-generating (compared with a maximum possible power output for current generation conditions) to ensure sufficient power overhead is available to provide support for the network if the frequency falls below contingency deadband 52.

In some circumstances, additional spinning reserve may be implemented to support the frequency support methods described herein. For example, where it is intended for WPP 12 to provide frequency support for one or more sub-bands below the nominal operating frequency of the network, it is desirable to ensure that there is sufficient power available to implement the power offset curve(s) corresponding to those sub-band(s).

For example, baseline P-f curve 74 (see FIG. 5) can be the result of applying an additional spinning reserve offset indicated by arrow 98 to a starting baseline curve 99 across the full width of curve 99 (the skilled person will appreciate that starting baseline curve 99 may itself be the result of a spinning reserve offset (not shown) applied to a maximum power output curve for given generation conditions).

One way of ensuring sufficient power when providing frequency support as described herein is to offset (i.e., reduce) the active power of WPP 12 by the maximum offset of any sub-band for which WPP 12 intends to provide frequency support. However, this is only necessary when one of more of the sub-bands for which frequency support is being provided is below the nominal operating frequency of the network.

For example, referring to FIG. 18, if frequency support is to be provided only in sub-band 56, then the maximum positive offset that will be required is indicated by reference sign 406 (i.e., relative to the power level between sub-bands 56 and 58, where frequency support is not provided). The same applies even if frequency support is to be provided in sub-bands 58 and/or 60, because they do not require additional spinning reserve.

In contrast, if frequency support is to be provided in sub-band 54, then the maximum positive offset that will be required is indicated by reference sign 408 (again, relative to the power level between sub-bands 56 and 58, where frequency support is not provided). The same applies even if frequency support is to be provided in any combination of sub-bands 56, 58, and 60, because they either do not need to provide a positive power offset (sub-bands 58 and 60) or need only to provide a lesser positive power offset than that required by sub-band 54 (sub-band 56).

The additional spinning reserve offset can be implemented throughout any time period for which the frequency support is being provided.

The skilled person will appreciate that any required offset can be implemented across all generators within a powerplant, or any suitable combination thereof. For example, if a 1 MW offset is required for a 10MW power plant having 10×1 MW generators, then each generator can reduce its output power by 0.1 MW, half of the generators can each reduce their output by 0.2 MW, or two of the generators can each reduce their output by 0.5 MW, for example. It will also be appreciated that different generators can reduce their outputs by different amounts.

In the case of a hybrid powerplant, it may be desirable to provide the required power offset by controlling the amount of power contributed by the non-variable power generator(s). For example, the power output of a gas power plant or a battery energy storage system forming part of the power plant may vary its output levels in order to provide the required power offset.

Yet another option for providing the required offset is to use a short-term over-production mode. For example, some manufacturers offer the option to allow a WTG to produce more than its registered or nominal power output over a relatively short period, typically based on mechanical engineering fatigue load calculations for a specific site.

A WPP, such as WPP 12, can use such short-term over-production modes to provide at least some of the additional spinning reserve offset when providing frequency support at measured frequencies below the network's nominal operating frequency.

For example, a WTG with a registered or nominal power of 3 MW may offer an over-production mode during which it is able to temporarily produce 3.3 MW. During ordinary operation, when not providing frequency support and not operating in short-term overproduction mode, the WTG may output up to 3 MW. When providing frequency support at measured frequencies within first sub-band 54, for example, it may be necessary to provide, for example, a power offset (i.e., additional spinning reserve) of 0.2 MW.

Without the availability of a short-term over-production mode, and during conditions windy enough to enable the WTG to output its registered or nominal power of 3 MW, WTG would need to reduce its power output by the required power offset of 0.2 MW, limiting its production to 2.8 MW when the measured frequency means frequency support is not presently required.

However, by enabling the short-term over-production mode, the WTG can continue to operate at its nominal power of 3MW. It will only need to increase its power output into the over-production range if the measured frequency falls into first sub-band 54. In addition, it need only increase its power output in accordance with the offset curve for first sub-band 54, which requires access to only 0.2 MW of the available over-production capacity.

Even if the over-production capacity is not sufficient to provide all of the additional spinning reserve offset, it can still reduce the amount of curtailment required to provide the necessary additional spinning reserve.

Accordingly, where a WTG is providing frequency support for sub-band(s) below the network's nominal operating frequency, it may be possible to reduce or even avoid curtailing the output power of the WTG to ensure sufficient spinning reserve offset is available in the event the measured frequency falls into those sub-band(s).

Figure 20:
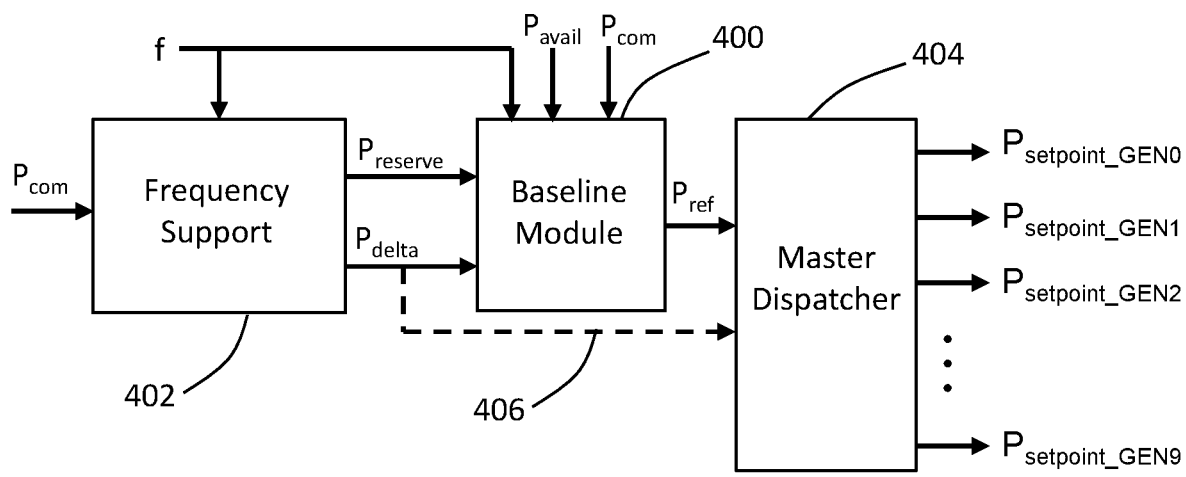
FIG. 20 shows functional components of a power plant controller.

FIG. 20 shows a functional block diagram, illustrating additional non-limiting examples of how the current power plant control method may be implemented. Each of the examples assumes the use of four sub-bands, such as first to fourth sub-bands 54-60 described above. However, the skilled person will appreciate that the principles described throughout this document, including in relation to FIG. 20, apply with any other number of sub-bands that overlap with the frequency contingency deadband, in any combination.

FIG. 20 shows an arrangement in which PPC 22 provides frequency control by way of a baseline module 400, a frequency support module 402 and a master dispatcher 404. Each of baseline module 400, frequency support module 402 and master dispatcher 404 can be implemented in software, firmware, hardware, or any suitable combination thereof, as will be understood by the skilled person. Similarly, the described functionality can be distributed across any software, firmware and/or hardware modules, which can be distributed in any suitable way throughout a power generation network.

Frequency support module 402 receives the measured frequency f and a power command $P_{com}$. The power command $P_{com}$ is a value representing the power the WPP should provide e.g., to the grid. $P_{com}$ may come from the grid operator or the owner of the WPP. Based on f and $P_{com}$, frequency support module 402 generates values $P_{reserve}$ and $P_{delta}$.

$P_{reserve}$ represents an additional spinning reserve offset that may need to be implemented in order for the powerplant to provide frequency support in sub-bands below the nominal operating frequency of the network, as was described above. For example, if it is intended to provide frequency support within second sub-band 56, and the maximum power offset only within second sub-band 56 is 2 MW, then $P_{reserve}$ will be 2 MW. If it is intended to provide frequency support only within first sub-band 54, and the maximum power offset only within first sub-band 54 is 3 MW, then $P_{reserve}$ will be 3 MW.

It should be noted that the baseline P-f curve should be offset by the additional spinning reserve offset represented by $P_{reserve}$ in anticipation of frequency support being required. For example, if frequency support is to be provided for only first sub-band 54 for an hour between, say, midday and 13:00, then based on the example above, the value of $P_{reserve}$ would become 3MW at midday. The additional spinning reserve offset is then available if the frequency falls within first sub-band 54 between midday and 13:00. The skilled person will appreciate that the spinning reserve may not actually be accessed if the measured frequency does not fall within the relevant sub-band during the timeframe for which the frequency support has been agreed.

It should also be noted that additional spinning reserve may be cumulative. For example, if it is intended to provide frequency support within both first sub-band 54 and second sub-band 56 in the example above, then the value of $P_{reserve}$ can be 5 MW (i.e., the sum of 3 MW for first sub-band 54 and 2 MW for second sub-band 56).

$P_{delta}$ is a power offset value, indicative of an offset to be applied by baseline module 400 to a baseline P-f curve, as a result of the measured frequency falling within a sub-band for which the power plant operator has agreed to provide frequency support.

Baseline module 400 receives measured frequency f, $P_{com}$, $P_{avail}$, $P_{reserve}$, and $P_{delta}$. When frequency support is not being provided for any of the sub-bands within frequency contingency deadband 52, frequency f and $P_{avail}$ or $P_{com}$ are used by baseline module 400 to determine a power reference value $P_{ref}$ based on the value of baseline P-f curve at the current network frequency. If $P_{com}$ is lower than $P_{avail}$ then the $P_{com}$ is used whereas if $P_{avail}$ is lower than $P_{com}$ then $P_{avail}$ is used. In the latter case the WPP cannot comply with the power command, but will provide as much power as possible, thus based on $P_{avail}$.

In addition to f, $P_{com}$ and $P_{avail}$, the values of $P_{reserve}$ and $P_{delta}$ are used by baseline module 400 when frequency support is being provided. As described above, if required by the frequency sub-band for which frequency support is to be provided, $P_{reserve}$ causes the baseline P-f curve to be offset downwards from $P_{com}$ or $P_{avail}$ on the power axis, in order to provide any necessary additional spinning reserve. Typically, this will be if the frequency support is being provided for a sub-band below the nominal operating frequency of the power network. If additional spinning reserve is not required, the value of $P_{reserve}$ is zero.

Any spinning reserve needed to provide frequency support within a particular sub-band (such as first sub-band 54 or second sub-band 56, for example) may be at least partly contributed to by any difference that currently exists between $P_{avail}$ and $P_{com}$. For example, if $P_{com}$ is lower than $P_{avail}$ within a sub-band for which it is necessary to provide spinning reserve, then it may be possible to either not shift the P-f curve down to provide the necessary spinning reserve, or at least to reduce the amount by which the P-f curve must be shifted down.

For example, a power plant for which frequency support is to be provided within second sub-band 54 may need to provide a 0.3 MW spinning reserve for the period during which the frequency support is to be provided. If $P_{avail}$ and $P_{com}$ are currently the same, then the output of the power plant will need to be reduced by the full 0.3 MW to provide the required spinning reserve. However, if $P_{com}$ is, say, 0.1 MW below $P_{avail}$, then the output of the power plant can be reduced by only 0.2 MW from its current (i.e., $P_{com}$) output, because the remaining 0.1 MW is already available as a result of the curtailment due to $P_{com}$ being less than $P_{avail}$. If $P_{com}$ is at least 0.3 MW (in the given example) below $P_{avail}$, the power output does not need to be reduced at all, because the required spinning reserve can be entirely provided within the existing curtailment due to $P_{com}$ being at least 0.3 MW less than $P_{avail}$.

While the value of f remains outside of any sub-band(s) for which frequency support is being provided, the value of $P_{delta}$ will remain zero, and the value of $P_{ref}$ output by baseline module 400 is determined based on the value of baseline P-f curve for the current frequency. $P_{ref}$ can, for example, take the form of a set point for the power plant.

If the value of f moves into a sub-band for which frequency support is being provided, then the value of $P_{delta}$ will increase or decrease in accordance with the corresponding P-f offset curve as described above. The value of $P_{ref}$ output by baseline module 400 is then determined based on the value of baseline P-f curve for the current f, offset by the value of $P_{delta}$.

Based on the $P_{ref}$ value received from baseline module 400, master dispatcher 404 generates individual set points $P_{setpoint\_GEN0}$, $P_{setpoint\_GEN1}$, ..., $P_{setpoint\_GEN9}$, and sends them to their respective generators.

Master dispatcher 404 can modify which set points to send to individual generators based on any requirements of the power plant or individual generators. For example, if any of the generators has a minimum power output, master dispatcher 404 can attempt to avoid sending, to those generator(s), set points that are below their respective minimum power outputs.

For example, a WTG may have a minimum power output corresponding to, say, 20% of its rated power output. Any set point corresponding to a power below that minimum power output will cause the WTG to pause (that is, to reduce its power output to zero). Pausing a WTG is generally undesirable, as starting and stopping can cause increased wear and tear on components such as bearings. Also, the reduced rotational speeds associated with low power output may make it difficult for a WTG to quickly ramp up its power output if required. Accordingly, master dispatcher 404 may make its best efforts to ensure that no WTG is paused. For example, the power plant may reduce the set points for other power generators within the power plant that are better able to reduce their power output. For example, the power output of a battery storage system may be reduced, potentially even to zero, in preference to pausing a WTG.

The skilled person will appreciate that references to sending set points to power generators includes sending any information indicative of the power characteristic to which the set point relates, and includes sending set points to a local controller (such as WTG controller 15) of one or more power generators.

In a slightly modified version of the arrangement of FIG. 20, $P_{delta}$ can be provided directly to master dispatcher 404, as indicated by dashed line 406. In that case, $P_{ref}$ does not have $P_{delta}$ applied to it by baseline module 400. Instead, master dispatcher uses $P_{ref}$ and $P_{delta}$ to directly generate set points for the generators.

The frequency support method above can be implemented within any suitable control function or module associated with one or more power generators or power plants. As well as a PPC 22 as described above, the frequency support method can be performed locally by a controller (such as WTG controller 15) of one or more power generators. It can also be implemented in software, firmware, and/or hardware remotely from the PPC, and the required set points provided to the PPC for forwarding to its associated power plant.

Wherever the method is implemented, look-up tables or curves of P-f offset values can be accessed to determine a set point for controlling a power characteristic of the power plant. The look-up tables or curves may be accessed via a communications network, such as a wired or wireless IP-based network. Alternatively, the tables or curves of P-f offset values may be stored locally.

A fallback scheme may be used to allow ongoing frequency support even in the event of a loss of communication between PPC 22 and WTG controllers 15. PPC 22 can supply one or more P-f curve(s) to each WTG controller 15, which the WTG controller is to use in the event of a failure of the communication link between PPC 22 and WTG controllers 15.

For example, PPC 12 can provide a baseline P-f curve and one or more offset curves for any sub-band(s) for which frequency support is to be provided. Alternatively, a single output P-f curve can be provided, implicitly incorporating the required offsets, as described above.

Optionally, the or each P-f curve can be supplied with an application period, or at least an expiry time. For example, each hour, PPC 22 may transfer new P-f curve(s) to its WTG controllers for use in the following hour. If communication is lost during the hour for which the current P-f curve(s) are being applied, the WTG controller can generate set points based on the current P-f curve(s), independently from PPC 22. Should the communication loss continue beyond the time period for which the P-f curve(s) have been specified, the WTG controllers 15 can continue to use the same P-f curve(s), fall back to a default P-f curve (such as baseline P-f curve, for example), shut down their corresponding WTGs, or can implement any other suitable behaviour.

A related optional approach can be used when PPC 22 loses communication with a remote control system, such as a cloud based control system operated by an owner or operator of the PPC. For example, the PPC 22 can be provided with, say, the next day's P-f curve(s), for example on an hour-by-hour basis. In the event any PPC 22 loses communication with its control system, the appropriate P-f curves can still be implemented.

The skilled person will appreciate that references to periods such as hours or days in the preceding paragraphs are examples only, and any other suitable time period or periods may be used depending upon the implementation.

Optionally, any additional power generated or reduced as a result of applying a frequency support offset to the baseline P-f curve may be logged, for technical and/or commercial purposes. For example, the system can log differences between a current baseline P-f curve and any offset P-f value applied as a result of the measured frequency falling within a sub-band for which the plant operator has agreed to provide frequency support. This can be done by integrating or averaging offset values over suitable time periods. In this way, a cumulative amount of power generated or reduced as a result of providing frequency support services can be determined for any desired period.

The cumulative power can be recorded at any desired resolution. For example, if commercial agreements to provide frequency support are defined on an hourly basis, then it will be convenient to record the cumulative power at a resolution of no more than an hour. Shorter term records (of the order of seconds or minutes, for example) can be summed to give hourly values, and larger values (daily, monthly, annual etc.) can be determined accordingly.

It will be appreciated that various changes and modifications can be made to the examples described above without departing from the scope of the present invention.

The invention claimed is:

1. A method for controlling a power plant that comprises at least one power generator, the power plant having a variable available power output at least partly due to variability of an energy source powering the at least one power generator, the method comprising:
   receiving a measured frequency of a power network to which the power plant is connected;
   determining whether the measured frequency falls within a first frequency sub-band, the first frequency sub-band overlapping a network-defined frequency deadband; and
   responsive to the measured frequency falling within the first frequency sub-band, and based at least in part on the measured frequency, outputting a first control signal indicative of either:
      a first power offset, for application to a baseline frequency curve for the power plant to generate a set point for controlling a power characteristic of the power plant; or
      a set point for controlling a power characteristic of the power plant, the set point being based on a first power offset applied to a baseline frequency curve for the power plant.

2. The method of claim 1, wherein a position of the baseline frequency curve on a power axis varies at least partly in dependence upon the available power output of the power plant.

3. The method of claim 1, wherein the first frequency sub-band is bounded by a first frequency and a second frequency, wherein:
   the first frequency is lower than the second frequency;
   the second frequency is lower than or equal to a nominal frequency of the power network; and
   the first power offset is positive.

4. The method of claim 3, wherein a value of the first power offset at the second frequency is zero, such that there is a stepless transition in set points as the measured frequency drops below the second frequency.

5. The method of claim 3, wherein, as the measured frequency falls from the second frequency towards the first frequency, the first power offset:
   ramps up in value over a first frequency range; and
   remains constant or ramps up at a lower rate over a second frequency range that is lower than the first frequency range.

6. The method of claim 5, wherein:
   the first frequency range is continuous with the second frequency range; and
   the first and second frequency ranges cover the whole of the first frequency sub-band.

7. The method of any one of claim 3, comprising:
   determining whether the measured frequency falls within a second frequency sub-band, the second frequency sub-band overlapping the network-defined frequency deadband; and
   responsive to the measured frequency falling within the second frequency sub-band, and based at least in part on the measured frequency, outputting a second control signal indicative of either:
      a second power offset, for application to the baseline frequency curve for the power plant to generate a set point for controlling the power characteristic of the power plant; or
      a set point for controlling the power characteristic of the power plant, the set point being based on the second power offset applied to the baseline frequency curve for the power plant.

8. The method of claim 7, wherein the second frequency sub-band is bounded by a third frequency and a fourth frequency, wherein:
   the third frequency is lower than the fourth frequency;
   the third frequency is higher than or equal to the nominal frequency of the power network; and
   the second power offset is negative.

9. The method of claim 8, wherein a value of the second power offset at the third frequency is zero, such that there is a stepless transition in set points as the measured frequency rises above the third frequency.

10. The method of claim 8, wherein, as the measured frequency rises above the third frequency towards the fourth frequency, the first power offset:
    ramps down in value over a third frequency range; and
    remains constant or ramps down at a lower rate over a fourth frequency range that is higher than the third frequency range.

11. The method of claim 10, wherein:
the third frequency range is continuous with the fourth frequency range; and
the third and fourth frequency ranges cover the whole of the second frequency sub-band.

12. The method of claim 1, wherein, responsive to the measured frequency falling within a further sub-band, and based at least in part on the measured frequency, outputting a further control signal indicative of either:
a further power offset, for application to the baseline frequency curve for the power plant to generate a set point for controlling the power characteristic of the power plant; or
a set point for controlling the power characteristic of the power plant, the set point being based on a further power offset applied to a baseline frequency curve for the power plant;
wherein the further sub-band is within the network-defined frequency deadband but does not overlap any other sub-band.

13. A method of controlling a power plant that comprises at least one power generator, the power plant having a variable available power output at least partly due to variability of an energy source powering the at least one power generator, the method comprising:
receiving a measured frequency of a power network to which the power plant is connected;
only upon determining that the measured frequency falls within a sub-band(s) for which a frequency support mode is determined to be in operation:
determining whether the measured frequency falls within a first frequency sub-band, the first frequency sub-band overlapping a network-defined frequency deadband; and
responsive to the measured frequency falling within the first frequency sub-band, and based at least in part on the measured frequency, outputting a first control signal indicative of either:
a first power offset, for application to a baseline frequency curve for the power plant to generate a set point for controlling a power characteristic of the power plant; or
a set point for controlling a power characteristic of the power plant, the set point being based on a first power offset applied to a baseline frequency curve for the power plant.

14. The method of claim 13, comprising:
at a start of a period for which the frequency support mode is determined to be in operation, curtailing a power output of the power plant to provide sufficient additional spinning reserve to support a maximum value of any power offset to be applied to the baseline frequency curve.

15. A power plant controller configured to perform an operation for controlling a power plant that comprises at least one power generator, the power plant having a variable available power output at least partly due to variability of an energy source powering the at least one power generator, the operation comprising:
receiving a measured frequency of a power network to which the power plant is connected;
determining whether the measured frequency falls within a first frequency sub-band, the first frequency sub-band overlapping a network-defined frequency deadband; and
responsive to the measured frequency falling within the first frequency sub-band, and based at least in part on the measured frequency, outputting a first control signal indicative of either:
a first power offset, for application to a baseline frequency curve for the power plant to generate a set point for controlling a power characteristic of the power plant; or
a set point for controlling a power characteristic of the power plant, the set point being based on a first power offset applied to a baseline frequency curve for the power plant.

16. The power plant controller of claim 15, wherein a position of the baseline frequency curve on a power axis varies at least partly in dependence upon the available power output of the power plant.

17. The power plant controller of claim 15, wherein the first frequency sub-band is bounded by a first frequency and a second frequency, wherein:
the first frequency is lower than the second frequency;
the second frequency is lower than or equal to a nominal frequency of the power network; and
the first power offset is positive.

18. The power plant controller of claim 17, wherein a value of the first power offset at the second frequency is zero, such that there is a stepless transition in set points as the measured frequency drops below the second frequency.

19. The power plant controller of claim 17, wherein, as the measured frequency falls from the second frequency towards the first frequency, the first power offset:
ramps up in value over a first frequency range; and
remains constant or ramps up at a lower rate over a second frequency range that is lower than the first frequency range.

20. The power plant controller of claim 19, wherein:
the first frequency range is continuous with the second frequency range; and
the first and second frequency ranges cover the whole of the first frequency sub-band.

* * * * *